US012619821B2

(12) United States Patent　　(10) Patent No.:　US 12,619,821 B2

Imanigooghari et al.　　(45) Date of Patent:　May 5, 2026

(54) EXPEDITING GENERATIVE TOKEN PRODUCTION USING SPECULATIVE SAMPLING, ADDED GUIDANCE, AND LANGUAGE MODELS OF DIFFERENT CAPACITIES

(71) Applicant: Microsoft Technology Licensing, LLC, Redmond, WA (US)

(72) Inventors: Ayyoob Imanigooghari, Munich (DE); Mohsen Fayyaz, Berlin (DE); Eric Chris Wolfgang Sommerlade, Oxford (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 202 days.

(21) Appl. No.: 18/395,189

(22) Filed: Dec. 22, 2023

(65) Prior Publication Data

US 2025/0209271 A1　　Jun. 26, 2025

(51) Int. Cl.
G06F 40/284　　(2020.01)
G06F 40/40　　(2020.01)

(52) U.S. Cl.
CPC ............ G06F 40/284 (2020.01); G06F 40/40 (2020.01)

(58) Field of Classification Search
CPC ........ G06F 40/284; G06F 40/40; G06F 16/35; G06N 3/044; G06N 3/045
See application file for complete search history.

(56) References Cited

U.S. PATENT DOCUMENTS

| | | | |
|---|---|---|---|
| 2024/0320433 A1* | 9/2024 | Lott | G06F 40/284 |
| 2025/0053748 A1 | 2/2025 | Fayyaz et al. | |
| 2025/0086187 A1 | 3/2025 | Fayyaz et al. | |
| 2025/0209271 A1 | 6/2025 | Imanigooghari et al. | |
| 2025/0299026 A1 | 9/2025 | Imanigooghari et al. | |

OTHER PUBLICATIONS

Chen, Charlie, et al. "Accelerating large language model decoding with speculative sampling." arXiv preprint arXiv:2302.01318 (2023). (Year: 2023).*

Liu Xiaoxuan et al: "Online Speculative Decoding",, Oct. 17, 2023 (Oct. 17, 2023), XP093248186, Retrieved from the Internet: URL:https://arxiv.org/pdf/2310.07177v2 (Year: 2023).*

(Continued)

*Primary Examiner* — Anne L Thomas-Homescu

(57)　　　ABSTRACT

A technique accelerates the generative production of tokens using a target language model that operates in cooperation with a draft language model. The target language model is more capable, but slower, compared to the draft language model. In operation, the draft language model transforms prompt tokens into draft tokens. The target language model edits the draft tokens, e.g., by selecting zero, one, or more of the draft tokens, and by also predicting a next token to follow the draft token(s) (if any) that are selected. Further, the target language model produces guidance vector information. In a subsequent cycle, the draft language model uses the guidance vector information to produce an updated set of set of draft tokens. The guidance vector information informs the draft language model of the embedding space being used by the target language model. This achieves a more effective cooperative relation between the two models.

20 Claims, 16 Drawing Sheets

(56) References Cited

OTHER PUBLICATIONS

Devlin, et al., "BERT: Pre-training of Deep Bidirectional Transformers for Language Understanding," arXiv, arXiv:1810.04805v2 [cs.CL], May 24, 2019, 16 pages.

Scao, et al., "BLOOM: A 176B-Parameter Open-Access Multilingual Language Model," arXiv, arXiv:2211.05100v2 [cs.CL], Dec. 11, 2022, 62 pages.

Vaswani, et al., "Attention Is All You Need," in 31st Conference on Neural Information Processing Systems (NIPS 2017), 2017, 11 pages.

Brown, et al., "Language Models are Few-Shot Learners," arXiv, arXiv:2005.14165v4 [cs.CL], Jul. 22, 2020, 75 pages.

"Introducing The World's Largest Open Multilingual Language Model: BLOOM," available at https://bigscience.huggingface.co/blog/bloom, accessed on Feb. 13, 2023, 2 pages.

Houlsby, et al., "Parameter-Efficient Transfer Learning for NLP," arXiv, arXiv:1902.00751v2 [cs.LG], Jun. 13, 2019, 13 pages.

Leviathan, et al., "Fast Inference from Transformers via Speculative Decoding," in Proceedings of the 40th International Conference on Machine Learning, PMLR 202, Jul. 2023, 13 pages.

Chen, et al., "Accelerating Large Language Model Decoding with Speculative Sampling," arXiv, arXiv:2302.01318v1 [cs.CL], Feb. 2, 2023, 11 pages.

Hu, et al., "LoRA: Low-Rank Adaptation of Large Language Models," in Proceedings of 10th International Conference on Learning Representations, Apr. 2022, 13 pages.

Rafailov, et al., "Direct Preference Optimization: Your Language Model is Secretly a Reward Model," arXiv, arXiv:2305.18290v1 [cs.LG], May 29, 2023, 26 pages.

Banino, et al., "PonderNet: Learning to Ponder," in 8th ICML Workshop on Automated Machine Learning (2021), 2021, 16 pages.

Lester, Brian, "Guiding Frozen Language Models with Learned Soft Prompts," available at https://ai.googleblog.com/2022/02/guiding-frozen-language-models-with.html, Google Research Blogs, Feb. 10, 2022, 5 pages.

Lester, et al., "The Power of Scale for Parameter-Efficient Prompt Tuning," arXiv, arXiv:2104.08691v2 [cs.CL], Sep. 2, 2021, 15 pages.

Rao, et al., "DynamicViT: Efficient Vision Transformers with Dynamic Token Sparsification," in 35th Conference on Neural Information Processing Systems (NeurIPS 2021), 2021, 13 pages.

Hu, at al., "LoRA: Low-Rank Adaptation of Large Language Models," arXiv, arXiv:2106.09685v2 [cs.CL], Oct. 16, 2021, 26 pages.

Radford, et al., "Improving Language Understanding by Generative Pre-Training," available at https://cdn.openai.com/research-covers/language-unsupervised/language_understanding_paper.pdf, OpenAI, San Francisco, California, Jun. 11, 2018, 12 pages.

Touvron, et al., "LLaMA: Open and Efficient Foundation Language Models," arXiv, arXiv:2302.13971v1 [cs.CL], Feb. 27, 2023, 27 pages.

Fayyaz, et al., "Compressing Information Provided to a Machine-Trained Model Using Abstract Tokens," U.S. Appl. No. 18/232,485, filed Aug. 10, 2023, 62 pages.

Fayyaz, et al., "Executing a Client Model Using a Task Prompt Produced by a Main System," U.S. Appl. No. 18/244,229, filed Sep. 9, 2023, 52 pages.

Khoshnoodi, et al., "A Comprehensive Survey of Accelerated Generation Techniques in Large Language Models," arXiv, arXiv:2405.13019v2 [cs.CL], Mar. 24, 2024, 27 pages.

International Search Report and Written Opinion for PCT Application No. PCT/US2024/055295, mailing date Feb. 20, 2025, 15 pages.

Leviathan, et al., "Fast Inference from Transformers via Speculative Decoding," arXiv, arXiv:2211.17192v1 [cs.LG] Nov. 30, 2022, 12 pages.

Liu, et al., "Online Speculative Decoding," arXiv, arXiv:2310.07177v2 [cs.AI], Oct. 17, 2023, 14 pages.

Brown, et al., "Language Models are Few-Shot Learners," in 34th Conference on Neural Information Processing Systems (NeurIPS 2020), 2020, 25 pages.

Bubeck, et al., "Sparks of Artificial General Intelligence: Early experiments with GPT-4," arXiv, arXiv:2303.12712v5 [cs.CL], Apr. 13, 2023, 155 pages.

Wei, et al., "Emergent Abilities of Large Language Models," arXiv, arXiv:2206.07682v2 [cs.CL], Oct. 26, 2022, 30 pages.

Dehghani, et al., "The Efficiency Misnomer," arXiv, arXiv:2110.12894v2 [cs.LG], Mar. 16, 2022, 16 pages.

Frantar, et al., "GPTQ: Accurate Post-Training Quantization for Generative Pre-trained Transformers," arXiv, arXiv:2210.17323v2 [cs.LG], Mar. 22, 2023, 16 pages.

Gale, et al., "The State of Sparsity in Deep Neural Networks," arXiv, arXiv:1902.09574v1 [cs.LG], Feb. 25, 2019, 15 pages.

Ghazvininejad, et al., "Mask-Predict: Parallel Decoding of Conditional Masked Language Models," arXiv, arXiv:1904.09324v2 [cs.CL], Sep. 4, 2019, 10 pages.

Goyal, et al., "POWER-BERT: Accelerating BERT Inference via Progressive Word-vector Elimination," in Proceedings of the 37th International Conference on Machine Learning, Online, PMLR 119, 2020, 10 pages.

Gu, et al., "Non-Autoregressive Neural Machine Translation," arXiv, arXiv:1711.02281v2 [cs.CL], Mar. 9, 2018, 13 pages.

Gu, et al., "Levenshtein Transformer," in 33rd Conference on Neural Information Processing Systems (NeurIPS 2019), 2019, 11 pages.

Gunasekar, et al., "Textbooks Are All You Need," arXiv, arXiv:2306.11644v2 [cs.CL], Oct. 2, 2023, 26 pages.

Guo, et al., "Jointly Masked Sequence-to-Sequence Model for Non-Autoregressive Neural Machine Translation," in Proceedings of the 58th Annual Meeting of the Association for Computational Linguistics, Jul. 2020, pp. 376-385.

Han, et al., "Dynamic Neural Networks: A Survey," arXiv, arXiv:2102.04906v4 [cs.CV], Dec. 2, 2021, 20 pages.

Hinton, et al., "Distilling the Knowledge in a Neural Network," arXiv, arXiv:1503.02531v1 [stat.ML], Mar. 9, 2015, 9 pages.

Holtzman, et al., "The Curious Case of Neural Text Degeneration," arXiv, arXiv:1904.09751v1 [cs.CL], Apr. 22, 2019, 11 pages.

Iandola, et al., "SqueezeBERT: What can computer vision teach NLP about efficient neural networks?," arXiv, arXiv:2006.11316v1 [cs.CL], Jun. 19, 2020, 19 pages.

Jaszczur, et al., "Sparse is Enough in Scaling Transformers," arXiv, arXiv:2111.12763v1 [cs.LG], Nov. 24, 2021, 22 pages.

Jaszczur, et al., "Sparse is Enough in Scaling Transformers," in 35th Conference on Neural Information Processing Systems (NeurIPS 2021), 2021, 13 pages.

Jiang, et al., "Mistral 7B," arXiv, arXiv:2310.06825v1 [cs.CL], Oct. 10, 2023, 9 pages.

Gante, Joao, "Assisted Generation: a new direction toward low-latency text generation," available at https://huggingface.co/blog/assisted-generation, Hugging Face, May 11, 2023, 16 pages.

Kim, et al., "I-BERT: Integer-only BERT Quantization," arXiv, arXiv:2101.01321v3 [cs.CL], Jun. 8, 2021, 15 pages.

Kim, et al., "Speculative Decoding with Big Little Decoder," arXiv, arXiv:2302.07863v4 [cs.CL], Oct. 12, 2023, 21 pages.

Kitaev, et al., "Reformer: The Efficient Transformer," in International Conference on Learning Representations, 2020, 12 pages.

Lan, et al., "Albert: A Lite BERT for Self-supervised Learning of Language Representations," arXiv, arXiv:1909.11942v6 [cs.CL], Feb. 9, 2020, 17 pages.

Langley, Pat, "Crafting Papers on Machine Learning," available at https://icml.cc/Conferences/2002/craft.html, in ICML '00: Proceedings of the Seventeenth International Conference on Machine Learning, Jun. 2000, 7 pages.

Lee, et al., "Deterministic Non-Autoregressive Neural Sequence Modeling by Iterative Refinement," arXiv, arXiv:1802.06901v3 [cs.LG], Aug. 27, 2018, 11 pages.

Welleck, et al., "Non-Monotonic Sequential Text Generation," in Proceedings of the 36th International Conference on Machine Learning, PMLR 97, 2019, 11 pages.

Li, et al., "Textbooks Are All You Need II: phi-1.5 technical report," arxiv, arXiv:2309.05463v1 [cs.CL], Sep. 11, 2023, 16 pages.

(56) References Cited

OTHER PUBLICATIONS

Li, et al, "Hint-Based Training for Non-Autoregressive Machine Translation," arXiv, arXiv:1909.06708v1 [cs.CL], Sep. 15, 2019, 9 pages.
Michel, et al., "Are Sixteen Heads Really Better than One?," arXiv, arXiv:1905.10650v3 [cs.CL], Nov. 4, 2019, 13 pages.
Saha, "Can Language Models Teach Weaker Agents? Teacher Explanations Improve Students via Personalization," arXiv, arXiv:2306.09299v2 [cs.CL], Nov. 14, 2023, 2023, 23 pages.
Sanh, et al., "DistilBERT, a distilled version of BERT: smaller, faster, cheaper and lighter," arXiv, arXiv:1910.01108v4 [cs.CL], Mar. 1, 2020, 5 pages.
Schuster, et al., "Consistent Accelerated Inference via Confident Adaptive Transformers," arXiv, arXiv:2104.08803v2 [cs.CL], Sep. 9, 2021, 18 pages.
Schwartz, et al., "The Right Tool for the Job: Matching Model and Instance Complexities," arXiv, arXiv:2004.07453v2 [cs.CL], May 9, 2020, 12 pages.
Shao, et al., "Minimizing the Bag-of-Ngrams Difference for Non-Autoregressive Neural Machine Translation," in Proceedings of the AAAI Conference on Artificial Intelligence, vol. 34, 2020, pp. 198-205.
Shazeer, Noam, "Fast Transformer Decoding: One Write-Head is All You Need," arXiv, arXiv:1911.02150v1 [cs.NE], Nov. 6, 2019, 9 pages.
So, et al., "Primer: Searching for Efficient Transformers for Language Modeling," in 35th Conference on Neural Information Processing Systems (NeurIPS 2021), 2021, 13 pages.
Stern, et al., "Blockwise Parallel Decoding for Deep Autoregressive Models," in 32nd Conference on Neural Information Processing Systems (NeurIPS 2018), 2018, 10 pages.
Stern, et al., "Insertion Transformer: Flexible Sequence Generation via Insertion Operations," in Proceedings of the 36 th International Conference on Machine Learning, PMLR 97, 2019, 10 pages.
Sukhbaatar, et al., "Adaptive Attention Span in Transformers," in Proceedings of the 57th Annual Meeting of the Association for Computational Linguistics, Jul. 2019, pp. 331-335.
Zhang, et al., "OPT: Open Pre-trained Transformer Language Models," arXiv, arXiv:2205.01068v4 [cs.CL], Jun. 21, 2022, 30 pages.

Wellman, et al., "Theory of mind for learning and teaching: the nature and role of explanation," in Cognitive Development, vol. 19, Issue 4, Oct. 2004, pp. 479-497.
Sun, et al., "Instantaneous Grammatical Error Correction with Shallow Aggressive Decoding," in Proceedings of the 59th Annual Meeting of the Association for Computational Linguistics and the 11th International Joint Conference on Natural Language Processing, Aug. 2021, pp. 5937-5947.
Sun, et al., "Fast Structured Decoding for Sequence Models," in 33rd Conference on Neural Information Processing Systems (NeurIPS 2019), 2019, 11 pages.
Sun, et al., "MobileBERT: a Compact Task-Agnostic BERT for Resource-Limited Devices," arXiv, arXiv:2004.02984v2 [cs.CL], Apr. 14, 2020, 13 pages.
Touvron, et al., "Llama 2: Open Foundation and Fine-Tuned Chat Models," arXiv, arXiv:2307.09288v2 [cs.CL], Jul. 19, 2023, 23 pages.
Wang, et al., "Non-Autoregressive Machine Translation with Auxiliary Regularization," in AAAI'19/IAAI'19/EAAI'19: Proceedings of the Thirty-Third AAAI Conference on Artificial Intelligence and Thirty-First Innovative Applications of Artificial Intelligence Conference and Ninth AAAI Symposium on Educational Advances in Artificial Intelligence, Article No. 659, Jan. 2019, pp. 5377-5384.
Wei, et al., "Imitation Learning for Non-Autoregressive Neural Machine Translation," arXiv, arXiv:1906.02041v2 [cs.CL], Jul. 18, 2019, 9 pages.
Chen, et al., "Punica: Multi-Tenant LoRA Serving," arXiv, arXiv:2310.18547v1 [cs.DC], Oct. 28, Oct. 2023, 13 pages.
Leviathan, et al., "Fast Inference from Transformers via Speculative Decoding," arXiv, arXiv:2211.17192v2, May 18, 2023, 13 pages.
Xia, "Speculative Decoding: Exploiting Speculative Execution for Accelerating Seq2seq Generation," arXiv, arXiv:2203.16487v6 [cs.CL], Oct. 30, 2023, 17 pages.
Xia, et al., "Speculative Decoding: Lossless Speedup of Autoregressive Translation with Generalized Aggressive Decoding," arXiv, arXiv:2203.16487v5 [cs.CL], Oct. 16, 2023, 24 pages.
U.S. Appl. No. 18/232,485, filed Aug. 10, 2023.
U.S. Appl. No. 18/244,229, filed Sep. 9, 2023.

* cited by examiner

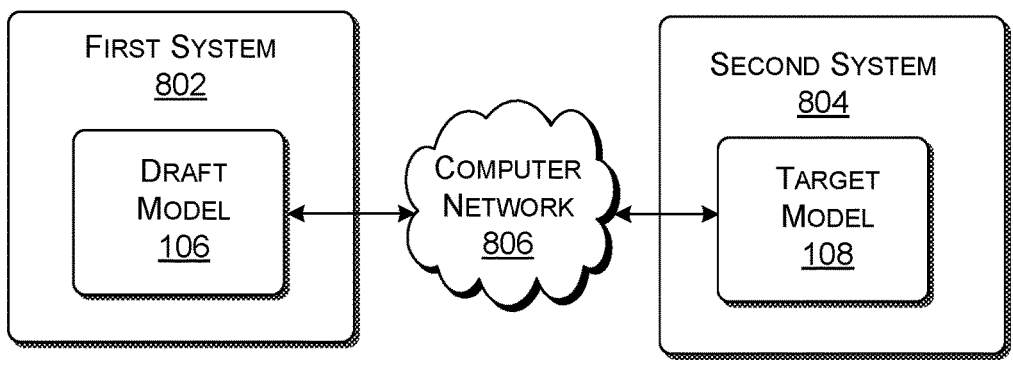

FIRST SYSTEM
802

DRAFT
MODEL
106

COMPUTER
NETWORK
806

SECOND SYSTEM
804

TARGET
MODEL
108

MODE-SELECTING COMPONENT 902

MANUAL MODE
SELECTOR 904

AUTOMATIC MODE
SELECTOR 906

P
908

GUIDANCE
VECTOR
INFO.(1)
910

DRAFT
LANGUAGE
MODEL
106

AUTO-
RECURSIVE
GENERATION

DRAFT
TOKENS
912

P
908

DRAFT
TOKENS
912

BASE
TARGET
LANGUAGE
MODEL
918

LANGUAGE MODEL
HEAD 920

TARGET
OUTPUT
914

VECTOR-CREATING
HEAD 922

GUIDANCE
VECTOR INFO.(2)
916

TARGET MODEL 108

FIG. 9

SINGLE FORWARD PASS

OPTIMAL DRAFT SIZE (TOKEN COUNT)

| IMPLEMENTATION | TARGET MODEL SIZE (NUMBER OF PARAMETERS) | |
| --- | --- | --- |
| | SIZE = 1.3 B | SIZE = 6.7 B |
| USING AUTO-REGRESSION WITH JUST DRAFT MODEL | -- | -- |
| USING SPECULATIVE SAMPLING | 3 | 5 |
| USING SPECULATIVE SAMPLING WITH GUIDANCE, WITH FINE-TUNING OF JUST TARGET MODEL | 4 | 6 |
| USING SPECULATIVE SAMPLING WITH GUIDANCE, WITH FULL FINE-TUNING | 4 | 7 |

FIG. 12

MACHINE-TRAINED MODEL

1302

POST PROCESSING COMPONENT
1326

OUTPUT EMBEDDING INFORMATION 1324

1328

NTH TRANSFORMER COMPONENT 1322

SECOND TRANSFORMER COMPONENT 1320

1318

ADD & NORMALIZE COMPONENT 2
1314

FFN COMPONENT
1312

ADD & NORMALIZE COMPONENT 1
1310

ATTENTION HEAD 1
1316

ATTENTION COMPONENT 1308

FIRST TRANSFORMER COMPONENT 1304

1306

1330

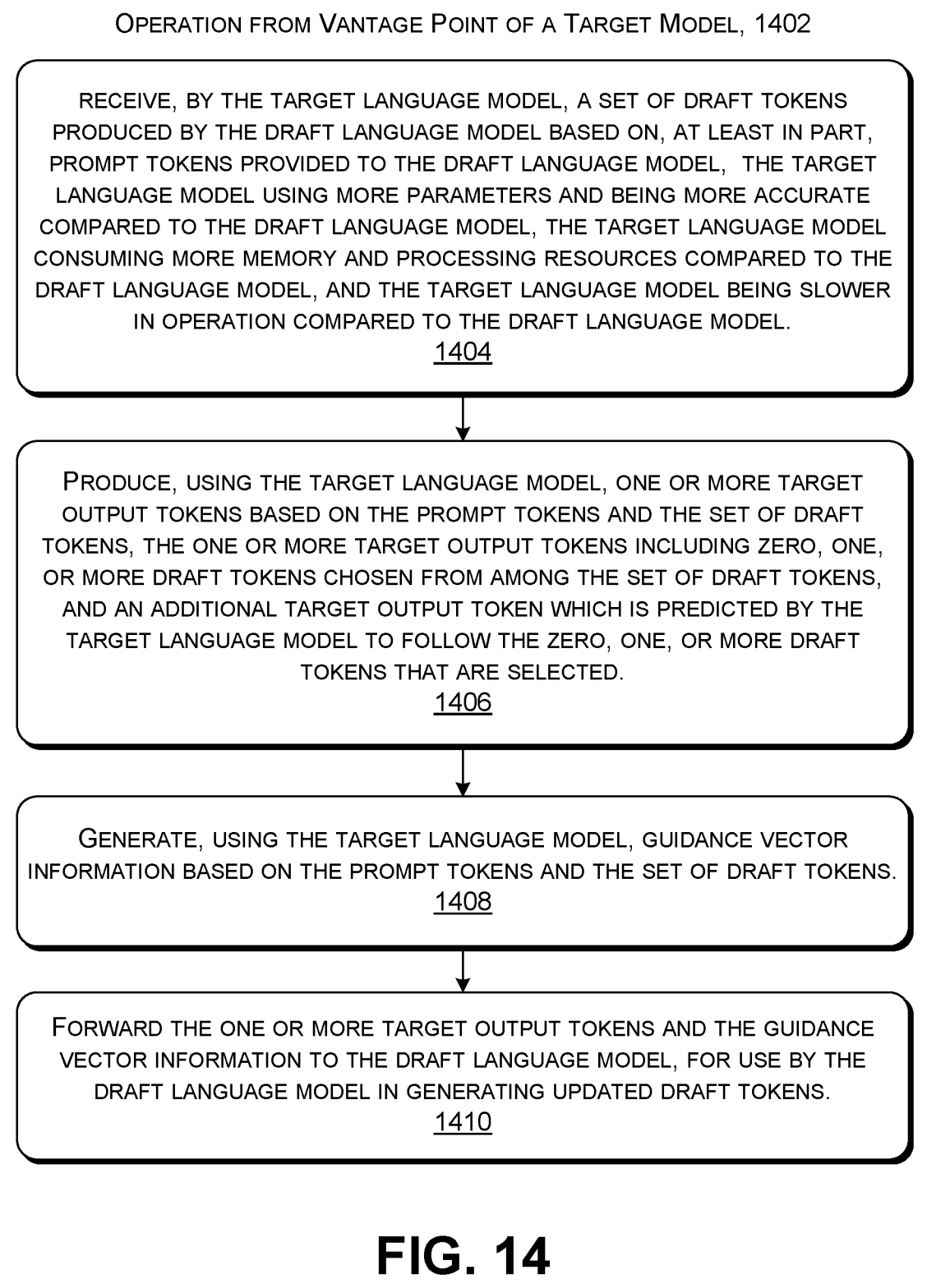

OPERATION FROM VANTAGE POINT OF A TARGET MODEL, 1402

RECEIVE, BY THE TARGET LANGUAGE MODEL, A SET OF DRAFT TOKENS PRODUCED BY THE DRAFT LANGUAGE MODEL BASED ON, AT LEAST IN PART, PROMPT TOKENS PROVIDED TO THE DRAFT LANGUAGE MODEL, THE TARGET LANGUAGE MODEL USING MORE PARAMETERS AND BEING MORE ACCURATE COMPARED TO THE DRAFT LANGUAGE MODEL, THE TARGET LANGUAGE MODEL CONSUMING MORE MEMORY AND PROCESSING RESOURCES COMPARED TO THE DRAFT LANGUAGE MODEL, AND THE TARGET LANGUAGE MODEL BEING SLOWER IN OPERATION COMPARED TO THE DRAFT LANGUAGE MODEL.
1404

PRODUCE, USING THE TARGET LANGUAGE MODEL, ONE OR MORE TARGET OUTPUT TOKENS BASED ON THE PROMPT TOKENS AND THE SET OF DRAFT TOKENS, THE ONE OR MORE TARGET OUTPUT TOKENS INCLUDING ZERO, ONE, OR MORE DRAFT TOKENS CHOSEN FROM AMONG THE SET OF DRAFT TOKENS, AND AN ADDITIONAL TARGET OUTPUT TOKEN WHICH IS PREDICTED BY THE TARGET LANGUAGE MODEL TO FOLLOW THE ZERO, ONE, OR MORE DRAFT TOKENS THAT ARE SELECTED.
1406

GENERATE, USING THE TARGET LANGUAGE MODEL, GUIDANCE VECTOR INFORMATION BASED ON THE PROMPT TOKENS AND THE SET OF DRAFT TOKENS.
1408

FORWARD THE ONE OR MORE TARGET OUTPUT TOKENS AND THE GUIDANCE VECTOR INFORMATION TO THE DRAFT LANGUAGE MODEL, FOR USE BY THE DRAFT LANGUAGE MODEL IN GENERATING UPDATED DRAFT TOKENS.
1410

FIG. 14

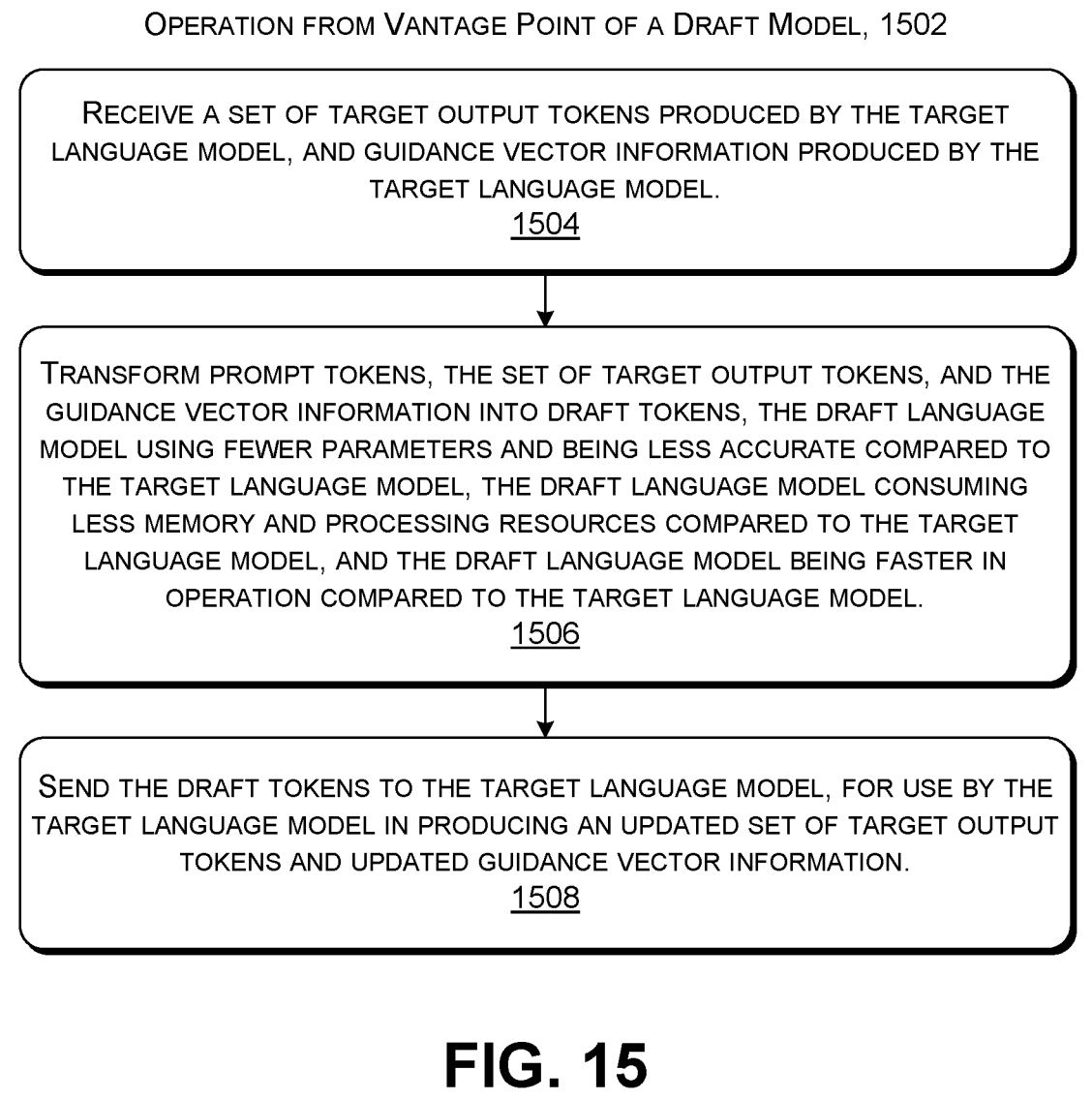

OPERATION FROM VANTAGE POINT OF A DRAFT MODEL, 1502

RECEIVE A SET OF TARGET OUTPUT TOKENS PRODUCED BY THE TARGET LANGUAGE MODEL, AND GUIDANCE VECTOR INFORMATION PRODUCED BY THE TARGET LANGUAGE MODEL.
1504

TRANSFORM PROMPT TOKENS, THE SET OF TARGET OUTPUT TOKENS, AND THE GUIDANCE VECTOR INFORMATION INTO DRAFT TOKENS, THE DRAFT LANGUAGE MODEL USING FEWER PARAMETERS AND BEING LESS ACCURATE COMPARED TO THE TARGET LANGUAGE MODEL, THE DRAFT LANGUAGE MODEL CONSUMING LESS MEMORY AND PROCESSING RESOURCES COMPARED TO THE TARGET LANGUAGE MODEL, AND THE DRAFT LANGUAGE MODEL BEING FASTER IN OPERATION COMPARED TO THE TARGET LANGUAGE MODEL.
1506

SEND THE DRAFT TOKENS TO THE TARGET LANGUAGE MODEL, FOR USE BY THE TARGET LANGUAGE MODEL IN PRODUCING AN UPDATED SET OF TARGET OUTPUT TOKENS AND UPDATED GUIDANCE VECTOR INFORMATION.
1508

FIG. 15

Figure 16:
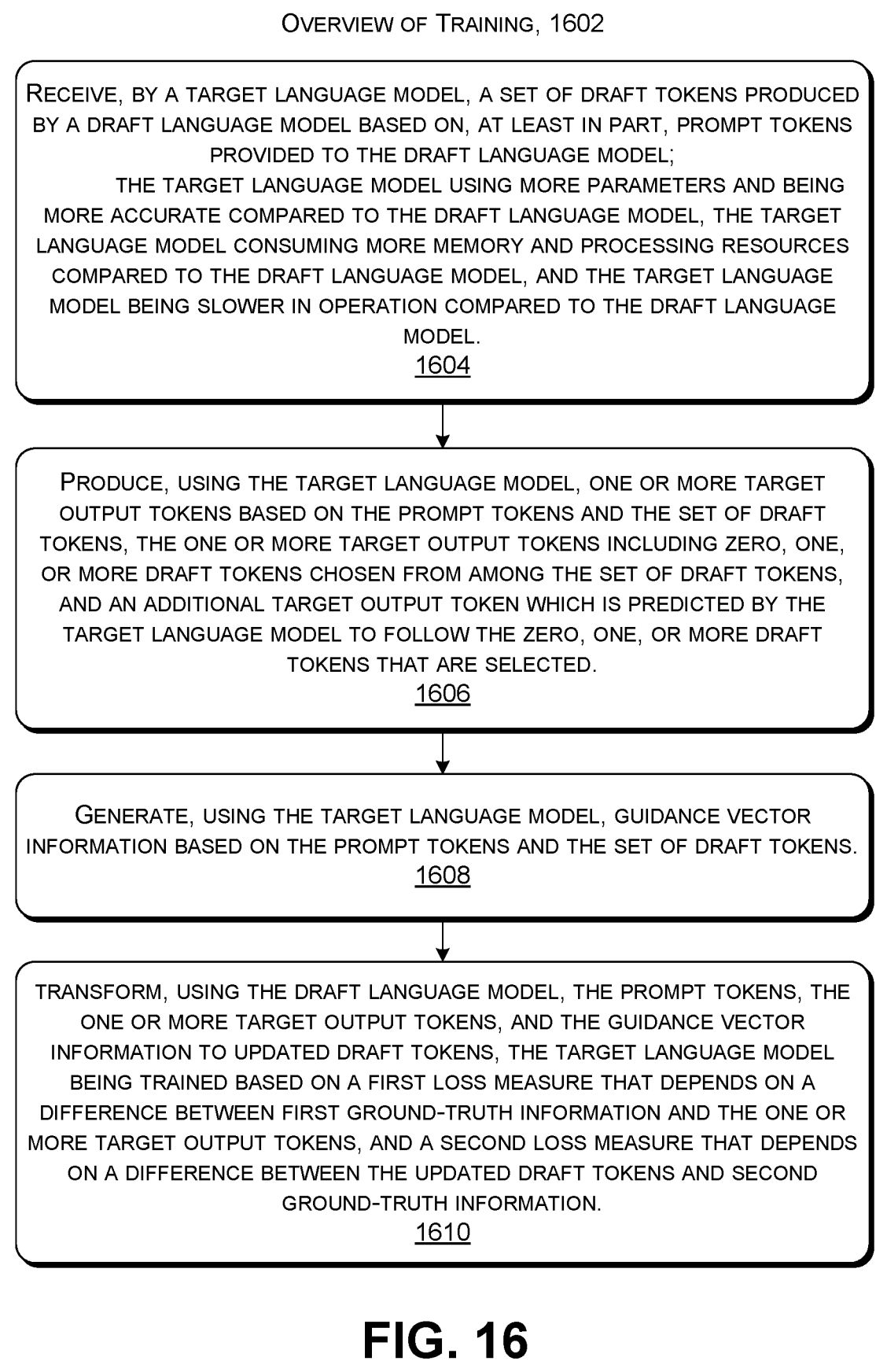

OVERVIEW OF TRAINING, 1602

RECEIVE, BY A TARGET LANGUAGE MODEL, A SET OF DRAFT TOKENS PRODUCED BY A DRAFT LANGUAGE MODEL BASED ON, AT LEAST IN PART, PROMPT TOKENS PROVIDED TO THE DRAFT LANGUAGE MODEL;

THE TARGET LANGUAGE MODEL USING MORE PARAMETERS AND BEING MORE ACCURATE COMPARED TO THE DRAFT LANGUAGE MODEL, THE TARGET LANGUAGE MODEL CONSUMING MORE MEMORY AND PROCESSING RESOURCES COMPARED TO THE DRAFT LANGUAGE MODEL, AND THE TARGET LANGUAGE MODEL BEING SLOWER IN OPERATION COMPARED TO THE DRAFT LANGUAGE MODEL.

1604

PRODUCE, USING THE TARGET LANGUAGE MODEL, ONE OR MORE TARGET OUTPUT TOKENS BASED ON THE PROMPT TOKENS AND THE SET OF DRAFT TOKENS, THE ONE OR MORE TARGET OUTPUT TOKENS INCLUDING ZERO, ONE, OR MORE DRAFT TOKENS CHOSEN FROM AMONG THE SET OF DRAFT TOKENS, AND AN ADDITIONAL TARGET OUTPUT TOKEN WHICH IS PREDICTED BY THE TARGET LANGUAGE MODEL TO FOLLOW THE ZERO, ONE, OR MORE DRAFT TOKENS THAT ARE SELECTED.

1606

GENERATE, USING THE TARGET LANGUAGE MODEL, GUIDANCE VECTOR INFORMATION BASED ON THE PROMPT TOKENS AND THE SET OF DRAFT TOKENS.

1608

TRANSFORM, USING THE DRAFT LANGUAGE MODEL, THE PROMPT TOKENS, THE ONE OR MORE TARGET OUTPUT TOKENS, AND THE GUIDANCE VECTOR INFORMATION TO UPDATED DRAFT TOKENS, THE TARGET LANGUAGE MODEL BEING TRAINED BASED ON A FIRST LOSS MEASURE THAT DEPENDS ON A DIFFERENCE BETWEEN FIRST GROUND-TRUTH INFORMATION AND THE ONE OR MORE TARGET OUTPUT TOKENS, AND A SECOND LOSS MEASURE THAT DEPENDS ON A DIFFERENCE BETWEEN THE UPDATED DRAFT TOKENS AND SECOND GROUND-TRUTH INFORMATION.

LOCAL
DEVICE

COMPUTER NETWORK
1708

SERVER

TOKEN-GENERATING SYSTEM 104

1702

EXPEDITING GENERATIVE TOKEN PRODUCTION USING SPECULATIVE SAMPLING, ADDED GUIDANCE, AND LANGUAGE MODELS OF DIFFERENT CAPACITIES

BACKGROUND

Large language models use a large number of parameters. In some cases, for instance, a large language model includes several billion parameters. The latency of language models grows with the size of the language models. As a consequence, a large language model may fail to provide a response in a sufficiently timely matter to satisfy the demands of some applications.

The technical literature has proposed the use of smaller language models. But reducing the size of a language model also negatively impacts the model's ability to understand a broad range of queries. One way of addressing this constraint is by fine-tuning the smaller language model to perform particular tasks of interest to a user. This manner of customizing a language model, however, is resource-intensive and time-consuming, and does not yield a language model that is capable of satisfactorily performing other tasks for which it was not fine-tuned.

SUMMARY

A technique is described herein for accelerating the generative production of tokens using a target language model that operates in cooperation with a draft language model. The target language model is more capable, but slower, compared to the draft language model. In operation, the draft language model transforms prompt tokens into draft tokens. The target language model edits the draft tokens, e.g., by selecting zero, one, or more of the draft tokens, and by also predicting a next token to follow the draft token(s) (if any) that are selected. Further, the target language model produces guidance vector information. In a subsequent cycle, the draft language model uses the guidance vector information to produce an updated set of set of draft tokens. The guidance vector information gives the draft language model insight into the embedding space used by the target language model, and therefore enables more effective interaction between these two models.

In many cases, the target language model will confirm at least some of the draft tokens produced by the draft language model as being correct. This allows the technique to adopt these tokens without the time-intensive need to auto-regressively generate these tokens using the target language model. Although these confirmed tokens have been auto-regressively generated using the draft language model, it takes considerably less time to produce tokens using the draft language model compared to the target language model. Thus, overall, the technique reduces the amount of time that is required to generatively produce tokens.

According to some implementations, the target language model is provided by a server system, and each instantiation of the draft system is provided by a local system, such as a user computing device. In other implementations, a single system implements both the target language model and the draft language model.

According to some implementations, the target language model edits the draft tokens in a single pass. The draft language model, on the other hand, auto-regressively produces the draft tokens.

According to some implementations, in another mode of operation, the target language model only generates a single instance of guidance vector information at the outset of the processing of a query. The draft language model uses the guidance vector information to produce output tokens without asking the target language model to perform verification via token editing. This mode is faster than the above-summarized mode, but produces output tokens of lower quality compared to the above-summarized mode.

The above-summarized technology is capable of being manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF DRAWINGS

FIG. 4 shows a method for generating tokens using speculative sampling, in a mode in which the generation of guidance vector information is turned on.

FIG. 8 shows an example in which a draft language model is implemented by a first system, and a target language model is implemented by a second system, the first and second systems being communicatively coupled via a computer network.

FIG. 9 shows one implementation of the token-generating system of FIGS. 1-6.

FIG. 12 is a chart that shows optimal draft sizes (in tokens) for token-generating systems that use different sizes of target language models.

FIG. 14 is a flowchart that provides an overview of one manner of operation of the token-generating system of FIGS. 1-6, from the perspective of a target language model.

FIG. 15 is a flowchart that provides an overview of one manner of operation of the token-generating system of FIGS. 1-6, from the perspective of a draft language model.

FIG. 16 is a flowchart that shows one manner of operation of the training system of FIG. 10.

The same numbers are used throughout the disclosure and figures to reference like components and features.

DETAILED DESCRIPTION

A. Illustrative Modes of Operation

Figure 1:
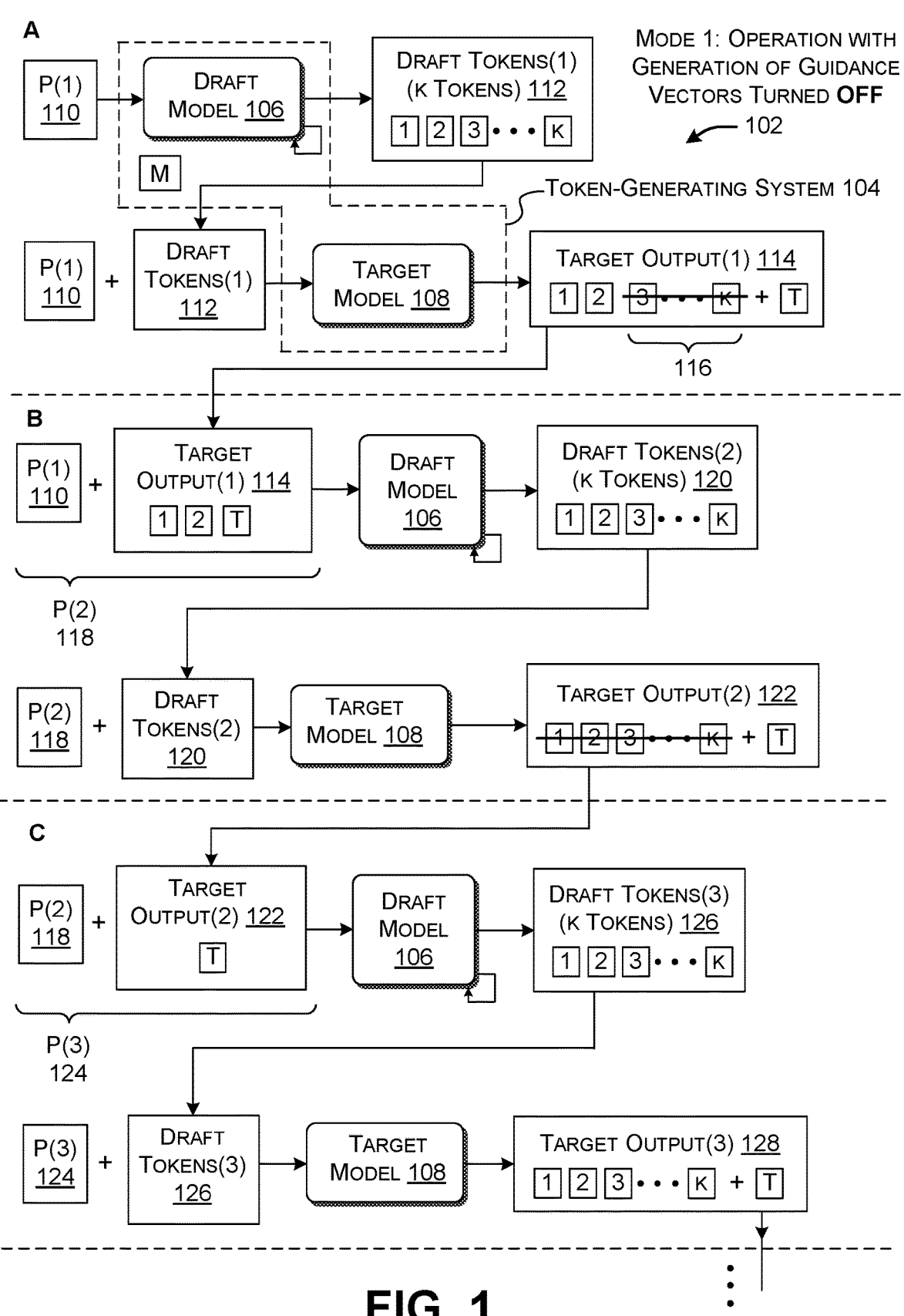
FIG. 1 shows a method of generating tokens using speculative sampling (also referred to as speculative decoding), in a mode in which the generation of guidance vector information is turned off. The method makes use of a token-generating system that includes a target language model and a smaller and quicker draft language model.

FIG. 1 shows a first method 102 for using a token-generating system 104 to generatively produce tokens in a first mode that uses speculative sampling, and in which the generation of guidance vector information (to be described below in FIGS. 4 and 5) is turned off. Speculative sampling is also referred to as speculative decoding. The token-generating system 104 includes a draft language model 106 and a target language model 108, which cooperatively exchange information with each other in the course of producing tokens. That is, the target language model 108 edits draft tokens produced by the draft language model 106, and the draft language model 106 transforms target output tokens produced by the target language model 108 into an updated set of draft tokens. The figures abbreviate these models as "draft language model" and "target language model," respectively. The symbol "M" shown in FIG. 1 refers to a mode-selecting component; this component selects a mode in which the token-generating system 104 operates, and is described below in Section B. A second mode and a third mode are described below with reference to FIGS. 4 and 6, respectively.

In all modes, the draft language model 106 has fewer parameters than the target language model 108. In some implementations, for instance, the draft language model 106 has several million parameters (e.g., 125 million parameters), while the target language model 108 includes over one billion parameters. By using fewer parameters, the draft language model 106 generates tokens in less amount of time compared to the target language model 108. This is because the number of computations that a language model performs grows with its size, and the latency of a language model generally increases with the number of computations it performs. However, the draft language model 106 is generally less accurate compared to the target language model 108. Further note that the accuracy of the draft language model 106 varies with complexity of the text it is attempting to interpret; it may provide adequate accuracy for "easy" cases of interpretation, and less satisfactory accuracy for more complex cases.

Figure 17:
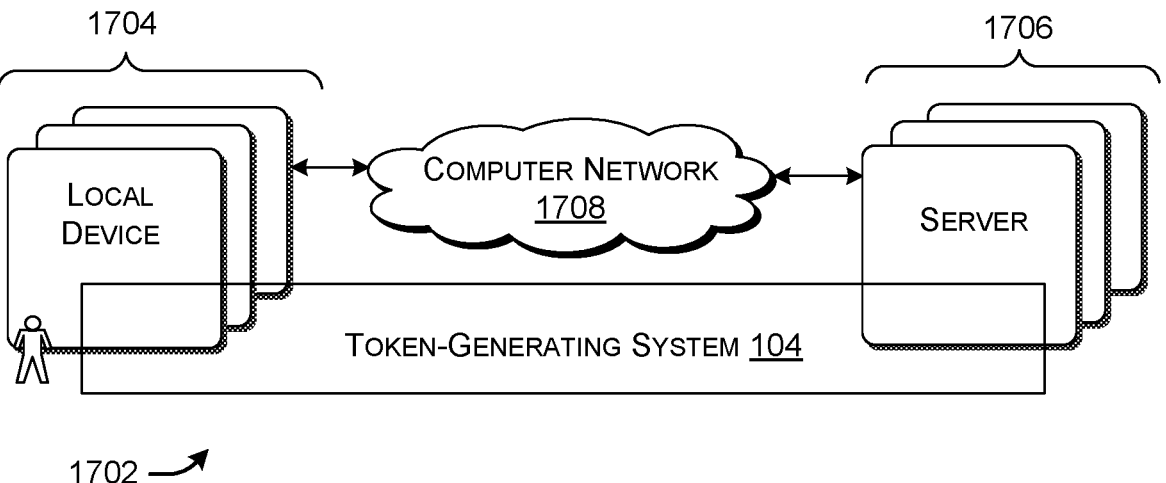
FIG. 17 shows computing equipment that, in some implementations, is used to implement the token-generating system of FIG. 1.
Figure 18:
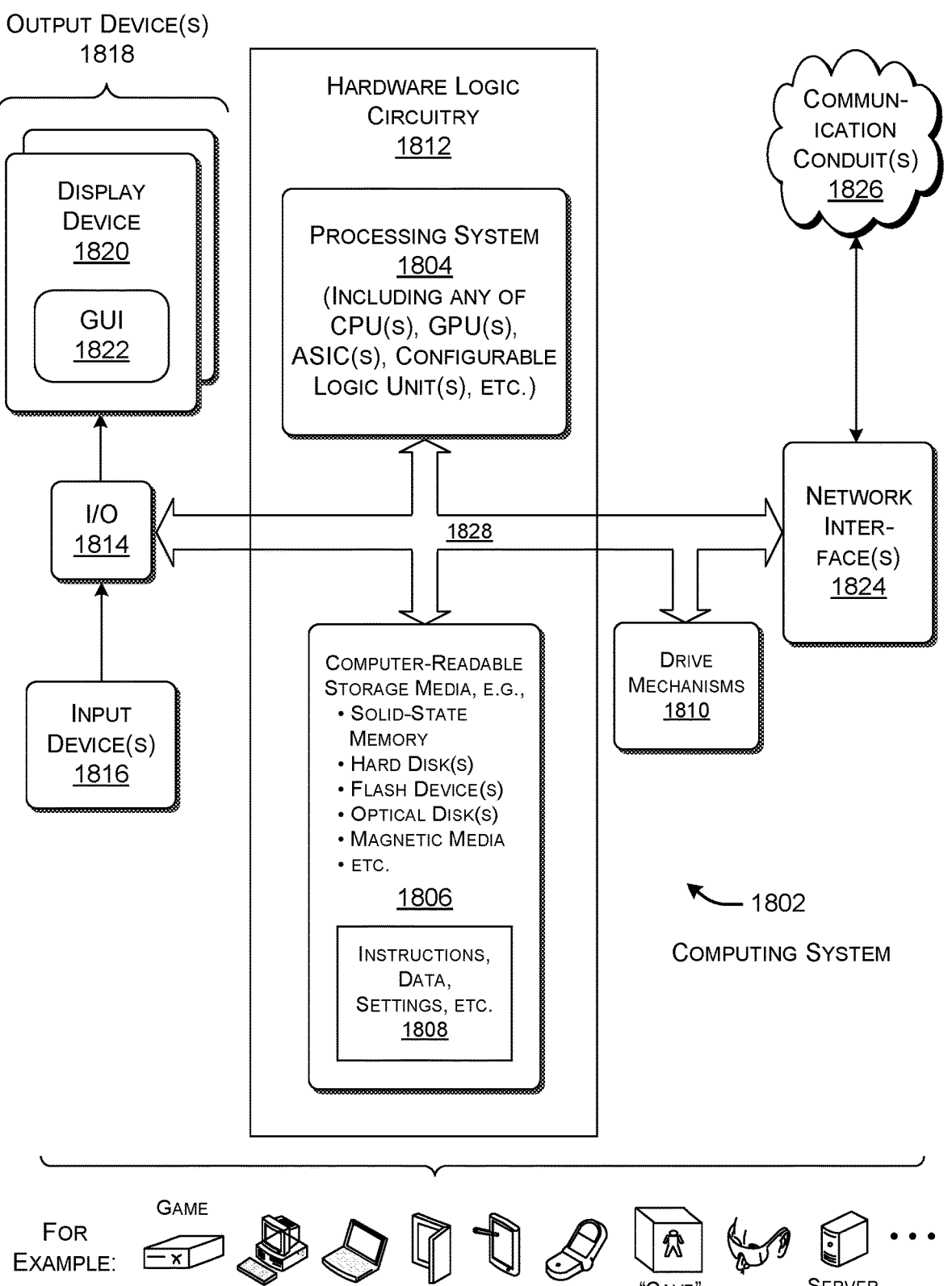
FIG. 18 shows an illustrative type of computing system that, in some implementations, is used to implement any aspect of the features shown in the foregoing drawings.

The following terminology is relevant to some examples presented below. A "machine-trained model" or "model" refers to computer-implemented logic for executing a task using machine-trained weights that are produced in a training operation. A "weight" refers to any type of parameter value that is iteratively produced by the training operation. A "token" refers to a unit of information processed by a machine-trained model, such as a word or a part of a word. In some cases, a tokenizer produces the tokens, but an item (e.g., a text passage) is said to be composed of tokens in a general sense (in which "token" is a synonym of "part"), irrespective of when and where those tokens are actually produced. A "prompt" refers to a sequence of tokens submitted to a machine-trained model. An "embedding" is a distributed vector that represents an information item in a vector space. A "distributed vector," in turn, expresses the semantic content of an information item by distributing information over its k dimensions. A distributed vector is in contrast to a sparse one-hot vector that allocates particular dimensions of the vector to particular concepts. In some contexts, terms such as "component," "module," "engine," and "tool" refer to parts of computer-based technology that perform respective functions. FIGS. 17 and 18, described below, provide examples of illustrative computing equipment for performing these functions.

A "language model" refers to a machine-trained model that functions as a pattern completion engine. The pattern completion engine includes parameters that reflect statistical patterns which have been learned by performing training on a typically large collection of training examples. In an auto-regressive mode of operation, given a set of input tokens, the pattern completion engine predicts a next token that is most likely to follow the input tokens. The pattern completion engine then adds the predicted token to the end of the input tokens, to produce an updated set of input tokens, and then repeats its analysis for the updated set of tokens. This process continues until the pattern completion engine predicts a stop token, which is a signal that the auto-regression operation should terminate. In some implementations, each of the language models (106, 108) of FIG. 1 uses an attention mechanism to perform its predictions. The attention mechanism determines the relevance between pairs of tokens in the set of input tokens. Additional information regarding one illustrative implementation of the language models (106, 108) is set forth below in connection with the explanation of FIG. 13.

FIG. 1 shows three cycles (labeled A, B, and C) of the method 102 of the first mode. Starting with the first cycle A, the draft language model 106 auto-regressively transforms prompt tokens 110 into k draft tokens 112, where k is system-specific parameter. For example, k is 6 in the following examples. In all figures, the looping arrow that feeds back to the draft language model 106 represents auto-regression. As used herein, "prompt tokens" refers to at least some of the tokens that are fed to a language model as input. Initially, for example, the prompt tokens 110 include the tokens of a system prompt followed by the tokens of a query prompt. The system prompt generally describes a task that a language model is being asked to perform. The query prompt contains any text to which the language model is asked to respond in a particular instance. For example, the query prompt specifies a question posed by a user.

As a next stage of cycle A, the target language model 108 transforms the prompt tokens 110 and the draft tokens 112 into target output tokens 114 in a single forward pass (rather than auto-regressively). The target output tokens 114 are abbreviated as a "target output" in the figures. More specifically, there are two parts to the operation of the target language model 108. As a first part, the target language model 108 edits the draft tokens 112. As a second function, the target language model 108 predicts a next token to follow the last token that is being retained, if any.

With respect to the first function, the target language model 108 examines the draft tokens 112 from left to right. For each draft token, the target language model 108 determines whether the target language model 108 is able to confirm the correctness of the draft token with a higher (or the same) probability compared to the draft language model 106. If this condition is met, the target language model 108 retains the draft token under consideration. If the condition is not met, the target language model 108 will choose whether or not to retain to the draft token by making a random prediction that is biased based on the ratio of the probability computed by the target language model 108 and the probability computed by the draft language model 106 for this draft token. Assume that the target language model 108 decides to reject the draft token under consideration. The target language model 108 will then reject all the remaining k draft tokens which follow the rejected draft token under consideration. In the example of FIG. 1, assume that the target language model 108 decides to reject the third draft token. If so, then the target language model 108 will also reject the fourth through $k^{th}$ draft tokens. FIG. 1 denotes the rejected draft tokens 116 by crossing them out.

In general, in the worst case, the target language model 108 will reject all the draft tokens, upon which it only generates one target output token (corresponding to the predicted token). In the best case, the target language model 108 will accept all k draft tokens, and therefore produce k+1 target output tokens (the last of which corresponds to the predicted token).

In cycle B, the token-generating system 104 appends the target output tokens 114 produced in cycle A to the end of the previous prompt tokens 110. For ease of reference, prompt tokens 118 represent the combination of the prompt tokens 110 and the target output tokens 114. The draft language model 106 transforms the updated prompt tokens 118 into new draft tokens 120. Next, the target language model 108 transforms the prompt tokens 118 and the draft tokens 120 to target output tokens 122. Assume that, in this case, the target language model 108 rejects all of the draft tokens 120, and thus, the only target output token that is produced is the predicted token.

In cycle C, the token-generating system 104 appends the target output tokens 122 produced in cycle B to the end of the previous prompt tokens 118. For ease of reference, prompt tokens 124 represent the combination of the prompt tokens 118 and the target output tokens 122. The draft language model 106 transforms the updated prompt tokens 124 into new draft tokens 126. Next, the target language model 108 transforms the prompt tokens 124 and the draft tokens 126 to target output tokens 128. Assume that, in this case, the target language model 108 accepts all of the draft tokens 126, and thus, the target output tokens 128 includes a total of k+1 tokens.

Figure 2:
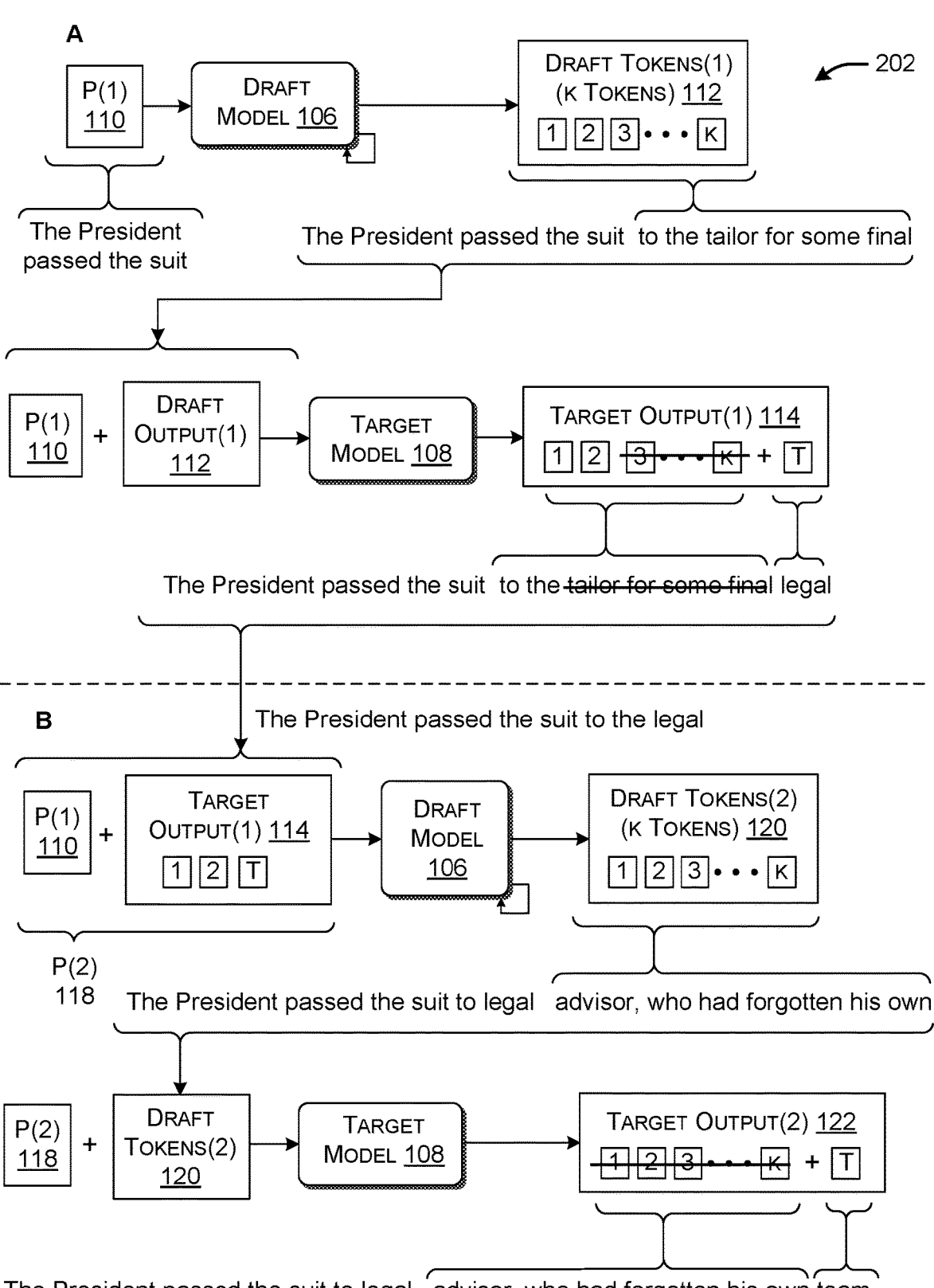
FIG. 2 shows an example of the first two phases shown in FIG. 1.

FIG. 2 shows an example of cycles A and B of the method 102 of FIG. 1. In cycle A, assume that the prompt tokens 110 initially include the incomplete text, "The president passed the suit." The draft language model 106 auto-regressively generates the candidate draft tokens 112 "to the tailor for some final." Here, the draft language model 106 interprets "suit" as an item of clothing, which will turn out to be incorrect. The target language model 108 accepts the draft tokens "to the," and rejects the remainder of the draft tokens 112 ("tailor for some final"). The target language model 108 also predicts a new token "legal" to follow the accepted draft tokens "to the."

In cycle B, the draft language model 106 transforms the updated prompt tokens 118 ("The President passed the suit to the legal") to new candidate draft tokens 120 ("advisor, who had forgotten his own"). In response, the target language model 108 rejects all of the draft tokens 120, and predicts the next token, the word "team."

The token-generating system 104 continues the manner of operation described above until the token-generating system 104 produces a stop token, which indicates that the set of generated tokens is complete. As noted above, the draft language model 106 is able to generate tokens in less time than the target language model 108. Thus, to the extent that the token-generating system 104 is able to rely on the draft language model 106 to generate at least some of the tokens in lieu of the target language model 108, it achieves the net effect of expediting the generation of tokens. In the worst case, the target language model 108 will only produce a predicted token at each cycle (because it rejects all of the candidate draft tokens in each cycle). This scenario would have the same (or similar) latency as the use of the target language model 108 alone to auto-regressively generate all of the tokens (without the use of the draft tokens). Thus, the token-generating system 104 has a latency that is no worse that the use of the target language model 108 operating alone.

Figure 3:
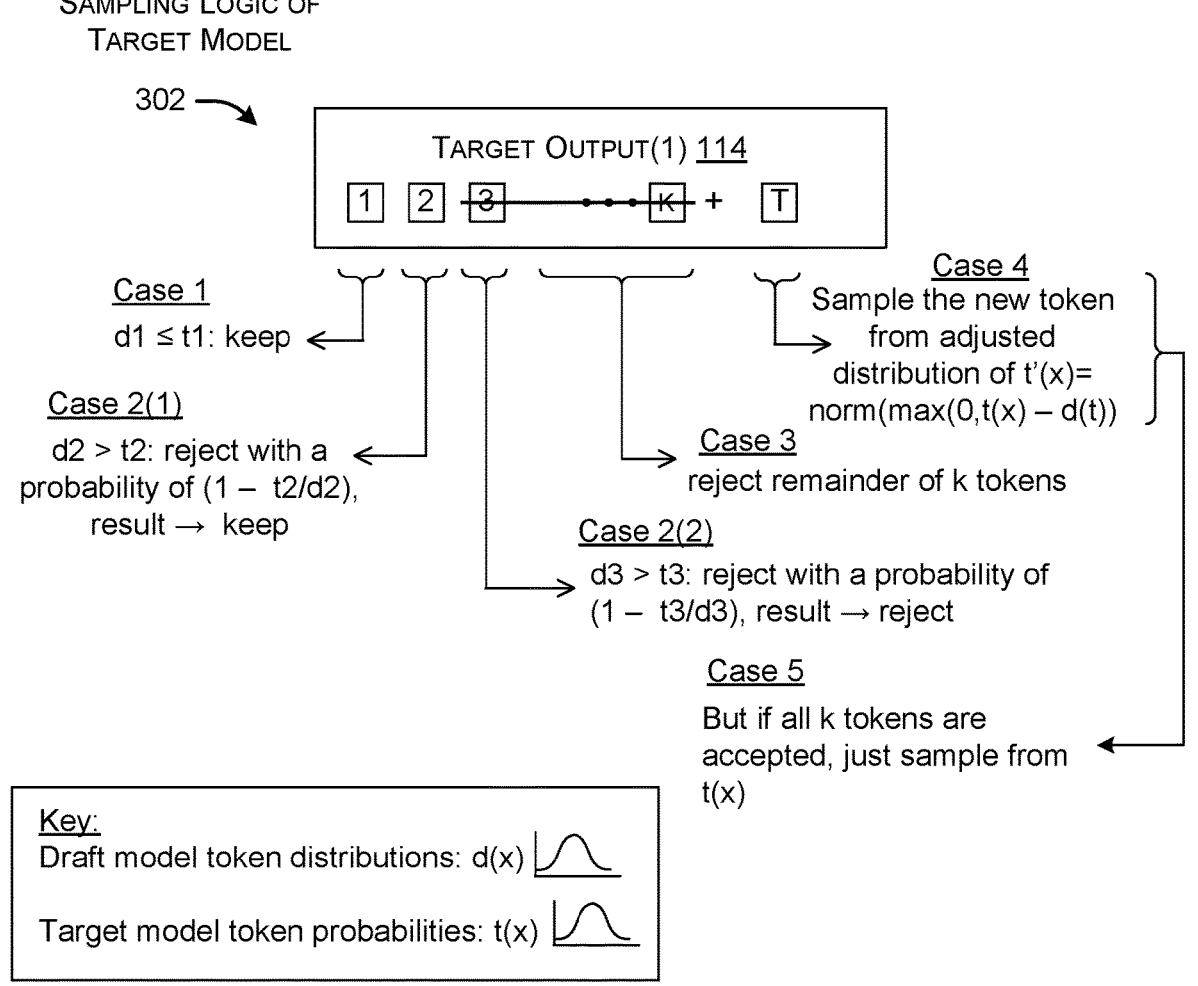
FIG. 3 shows illustrative logic for editing draft tokens produced by a draft language model.

FIG. 3 summarizes illustrative logic 302 by which the target language model 108 produces target output tokens. It performs this task by using scenario-specific rules to compare token probability information computed by the target language model 108 with token probability information computed by the draft language model 106. The outcome of these rules determines which draft tokens are retained and which are discarded.

More specifically, each language model assigns a probability to each token in a vocabulary of tokens, for each token position under consideration. A probability distribution expresses the distribution of these probabilities across the tokens in the vocabulary, for a given token position. For example, consider the third token position shown in cycle A. The draft language model 106 determines that the token with the highest probability for this slot is "tailor," while the target language model 108 may determine that the token with the highest probability for this slot is some token other than "tailor." The logic 302 determines whether to retain or discard the word "tailor" based on a comparison of probabilities assigned to this token by the two models (106, 108).

Assume that the draft language model 106 selects a particular draft token $T_D$ because it has a highest probability d, from its perspective. The target language model 108 independently determines a probability t of this draft token $T_D$. A first case applies when the probability t is higher or equal to the probability d. In response, the target language model 108 retains the draft token $T_D$ under consideration. A second case applies when the target language model 108 determines that the probability d is greater than the probability t. In response, the target language model 108 determines whether to keep the draft token $T_D$ by randomly selecting between the two options (to retain or discard) with a probability biased by (1−t/d). FIG. 3 shows two examples (2(1) and 2(2)) of the second case. In the first example 2(1), the target language model 108 decides to retain the draft token under consideration, and, in second example 2(2), the target language model 108 decides to discard the draft token under consideration. In a third case, the target language model 108 applies a rule that results in the rejection of all draft tokens ($T_{D+1}$ through $T_k$) which follow a draft token $T_D$ that is rejected based on the second case.

In a fourth case, the target language model 108 predicts a token to follow the last-accepted draft token by sampling from an adjusted probability of t'(x)=norm (max (0,t(x)−d (x)). This equation expresses a probability distribution that is equal to the maximum of 0 or the difference between t(x) and d(x). Norm refers to normalization. (As stated, a token probability distribution describes the distribution of probabilities over all candidate tokens, for a particular token position under consideration.) A fifth case is an exception to the fourth case for the situation in which the target language model 108 has accepted all k of the draft tokens. Here, the target language model 108 samples from its distribution t(x) without consideration of d(x).

Figure 4:
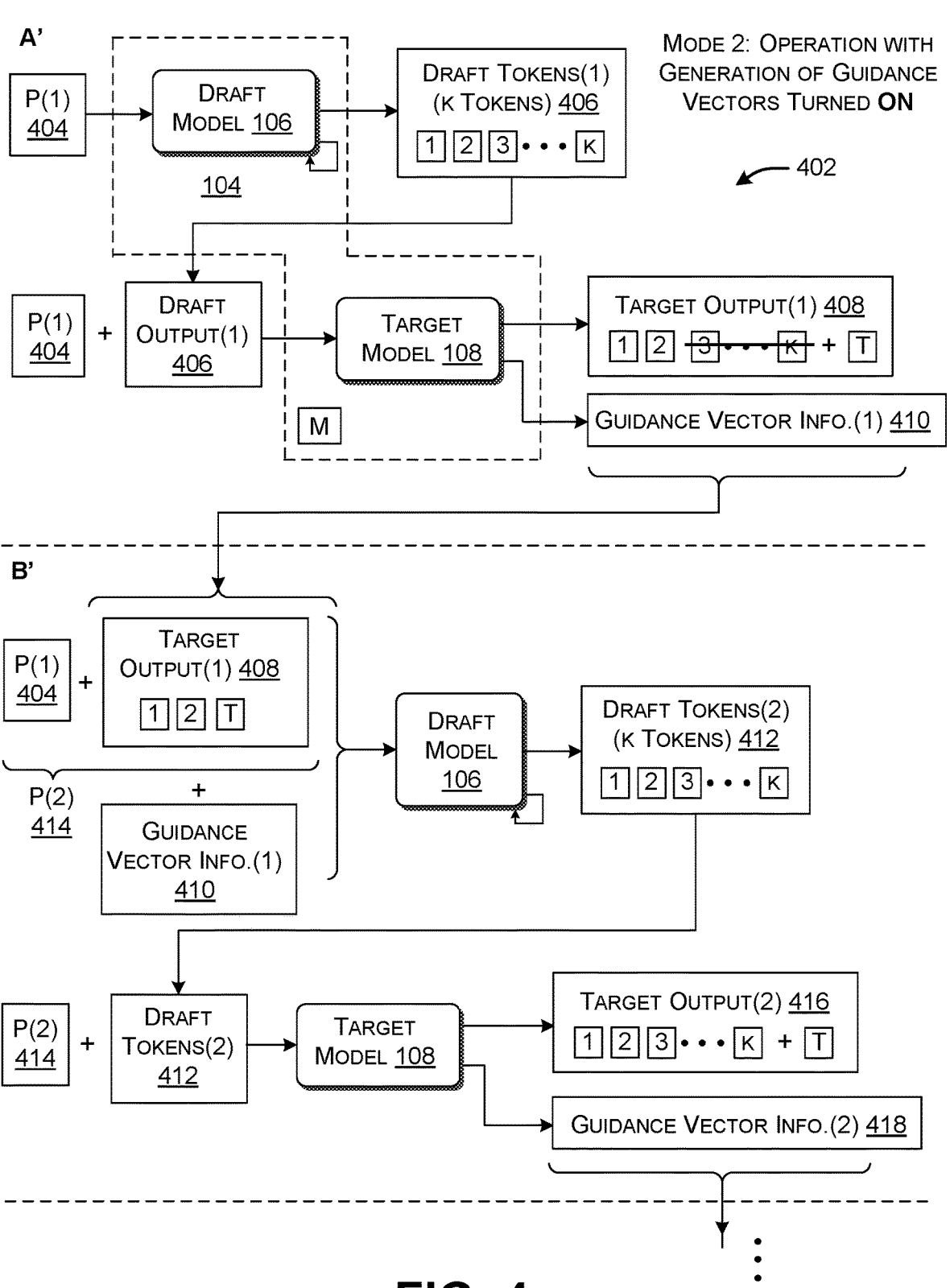

FIG. 4 shows a second method 402 for using the token-generating system 104 to generatively produce tokens in a second mode that uses speculative sampling. By way of overview, in the second method 402, the target language model 108 performs the additional function (compared to the first method 102) of generating guidance vector information. The draft language model 106 subsequently uses this guidance vector information to help it properly interpret the input tokens that are fed to it. The guidance vector information specifically informs the draft language model 106 of the composition of the target language model's embedding space, which the target language model 108 uses to produce target output tokens. In the first method 102, by contrast, the target language model 108 and the draft language model 106 work in isolation, other than passing text to each other; no model receives direct evidence of the embedding space used by the other model.

The guidance vector information is made up of one or more guidance vectors. Each guidance vector is a distributed vector that conveys some information about how the target language model 108 is interpreting a particular instance of draft tokens. A guidance vector serves a role akin to a token. In some implementations, however, unlike a token that has a fixed relationship with a particular text token, a human cannot readily understand the nuanced and complex ways in which any guidance vector maps to a combination of concepts in embedding space. In some implementations, the target language model 108 produces target vector information that includes a fixed number of guidance vectors.

Starting with cycle A of FIG. 4, the draft language model 106 transforms prompt tokens 404 into k draft tokens 406. The target language model 108 transforms a combination of the prompt tokens 404 and the draft tokens 406 into target output tokens 408 (using the logic 302 of FIG. 3) and a first instance of guidance vector information 410. In cycle B, the draft language model 106 transforms a combination of the prompt tokens 404, the target output tokens 408, and the guidance vector information 410 into a new set of draft tokens 412. The combination of prompt tokens 404 and the target output tokens 408 is referred to in FIG. 4 as an updated instance of prompt tokens 414. Then, the target language model 108 transforms a combination of the prompt tokens 414 and the draft tokens 412 to a new instance of target output tokens 416 and a new instance of vector guidance information 418.

Figure 5:
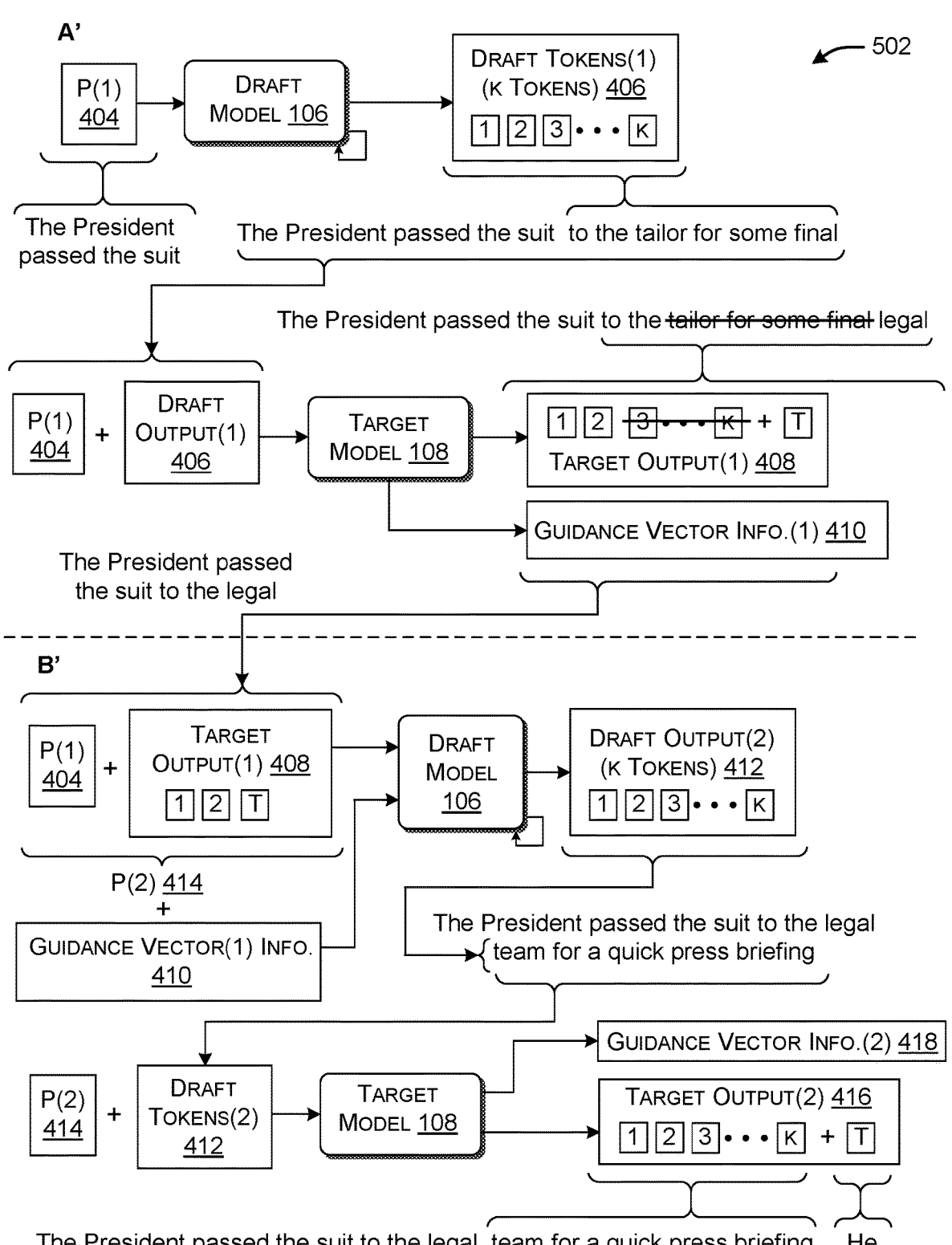
FIG. 5 shows an example of the application of the method of FIG. 4.

FIG. 5 shows an example 502 of the second method 402 of FIG. 4. In cycle A, assume that the prompt tokens 404 include the incomplete text, "The president passed the suit." The draft language model 106 auto-regressively generates the candidate draft tokens 406 of "to the tailor for some final." The target language model 108 accepts the draft tokens "to the," and rejects the remainder of the draft tokens 406. The target language model 108 also predicts a token "legal" to follow the accepted draft tokens "to the." So far, the token-generating system 104 produces the same tokens as the first example 202 of FIG. 2. In the second part of cycle A, the target language model 108 transforms a combination of the prompt tokens 404 and the draft tokens 406 to target output tokens 408 and a first instance of guidance vector information 410.

In cycle B, the draft language model 106 transforms a combination the prompt tokens 404 and the target output tokens 408 ("The President passed the suit to the legal") and the first instance of guidance vector information 410 to a new set of draft tokens 412: "team for a quick press briefing." The target language model 108 then transforms a combination of the prompt tokens 414 (which includes a combination of the prompt tokens 404 and the target output tokens 408) to new target output tokens 416 and a second instance of guidance vector information 418. In this example, the target language model 108 accepts all of the draft tokens 412, and predicts a new token for the word "He."

In summary, in cycle B, the first instance of guidance vector information 410 has therefore enabled the draft language model 106 to produce draft tokens 412 which are more aligned with the embedding space of the target language model 108. This increases the probability (as is the case here) that the target language model 108 will accept more of the draft tokens 412 as being correct. This behavior, in turn, has the ultimate effect of further reducing the amount of time that the token-generating system 104 requires to produce all of the output tokens. In other words, the use of guidance vector information allows the token-generating system 104 to more quickly converge on the correct tokens by overall accepting more of the draft tokens, with fewer cycles and fewer instances of auto-regression. It also reduces the number of interactions between the draft language model 106 and the target language model 108, which reduces communication-related costs.

Note that, in both the first and second methods (102, 402), the token-generating system 104 produces output tokens with the same accuracy as the case in which the target language model 108 is used by itself to auto-regressively generate all of the output tokens. The second mode, however, is faster than the first mode, on average.

Figure 6:
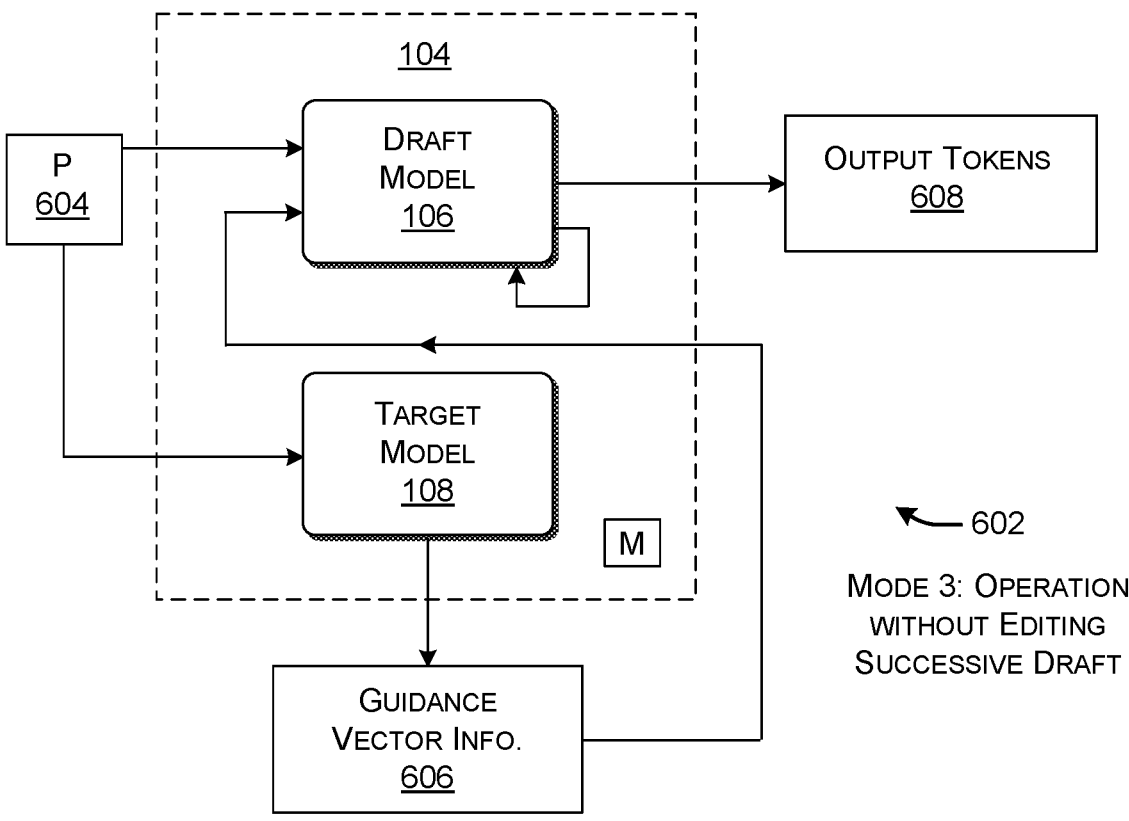
FIG. 6 shows a method of generating tokens in a model in which a target language model is consulted at the outset of decoding to obtain guidance vector information, but thereafter not used for speculative sampling.

FIG. 6 shows a third method 602 for using the token-generating system 104 to generatively produce tokens in a third mode. Here, the target language model 108 is not used to edit the draft tokens produced by the draft language model 106. This means that the third method 602 does not use speculative sampling, unlike the first and second methods (102, 402). As will be explained in greater detail below, the token-generating system 104 may opt to use the third method 602 when it is desirable to further reduce latency, and/or it is desirable to economize the usage of resources by the token-generating system 104, and there is some tolerance with respect to the accuracy of those tokens.

In a first phase, the token-generating system 104 sends prompt tokens 604 to the target language model 108. The prompt tokens 604 include whatever text is submitted, and for which the token-generating system 104 is asked to generate a response. For example, in some applications, the prompt tokens 604 express a query submitted by a user. The target language model 108 transforms the prompt tokens 604 into guidance vector information 606. The draft language model 106 then auto-regressively transforms the prompt tokens and the guidance vector information 606 into output tokens 608.

Because the draft language model 106 is smaller than the target language model 108, it is able to generate the output tokens 608 in less time compared to the use of the target language model 108 to auto-regressively generate the output tokens 608. The draft language model 106 is also faster than the token-generating system 104 when operating in the first and second modes. This is because these two modes consult the larger and slower target language model 108 for every cycle, while the token-generating system 104 of the third mode (of FIG. 6) only consults the target language model 108 at the outset of processing an initial prompt. But the token-generating system 104 of the third mode loses the benefit of the increased accuracy of the target language model 108, and therefore can be expected to overall produce less reliable and lower quality output tokens compared the first and second modes.

Further, note that the third mode shown in FIG. 6 reduces the use of resources in the token-generating system 104, compared to the exclusive use of the target language model 108 to auto-regressively generate tokens, and also compared to the first and second modes shown in FIGS. 1 and 4. These resources include memory resources, compute-related resources, and communication-related resources. The resource efficiency of the third mode stems from the fact that the token-generating system 104 reduces its use of resource-intensive operations performed by the target language model 108, e.g., by only calling the target language model 108 once per query. The draft language model 106 uses considerably fewer resources compared to the target language model 108, and therefore its use to generate all output tokens is less costly than the use of the target language model 108 in the modes of FIGS. 1 and 4.

Note that the token-generating system 104 is described above as being capable of invoking different modes. In other example, the token-generating system 104 is configured to primarily use a single mode of operation to generate output tokens. For example, in some implementations, a token-generating system operates in accordance with the approach shown in FIG. 6, with or without the capability of switching to the second mode shown in FIG. 4.

B. Illustrative Implementation of the Token-Generating System

Figure 7:
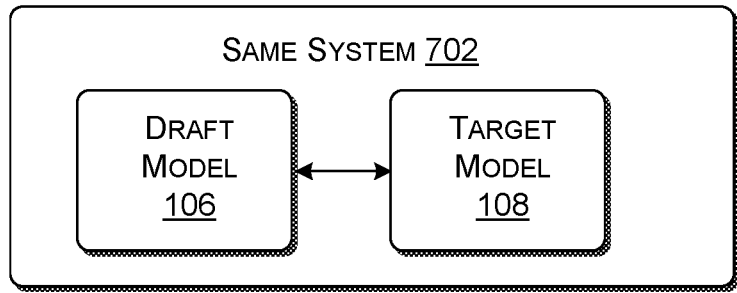
FIG. 7 shows an example in in which a draft language model and a target language model are implemented in a single system.

FIG. 7 shows an example in which a single system 702 is used to implement both the draft language model 106 and the target language model 108. For example, the system 702 is a local system with which a user interacts, such as a user device or plural user devices operating in cooperation. "Local" means that a system is locally placed with respect to the user who interacts with it. Or the system 702 is a remote system with which plural users interact via a computer network (not shown). "Remote" means that a system is remotely located with respect to a user who interacts with it. In some implementations, the remote system is implemented by one or more severs, and users interact with the servers via local browser applications, application programming interfaces (APIs), or other interface mechanisms.

FIG. 8 shows an example in which a first system 802 implements the draft language model 106 and a second system 804 implements the target language model 108. For example, the first system 802 is a local system (e.g., a user device or other client computing device) and the second system 804 is one or more servers with which the local system interacts via a computer network 806. In some implementations, all instances of the draft language model 106 provided by client computing devices are the same, although the client computing devices can have different hardware capabilities, operating systems, downstream applications, etc. Alternatively, in addition, the client devices use different instances of draft language models, e.g., as reflected in their machine-trained weights. Different draft language models can also use different architectures. A training system accommodates this type of environment by training the target language model 108 to successfully interact with a group of different draft language models. Section C provides further illustrative details on a training system for training the token-generating system 104.

FIG. 9 shows further illustrative details of one implementation of the token-generating system 104 introduced in Section A. An optional mode-selecting component 902 selects among the first, second, and third models described in Section A. In some implementations, a manual mode selector 904 allows a user to manually choose from among the three modes. For example, the manual mode selector 904 receives a selection of a mode from a user via a user interface presentation devoted to the task of configuration (not shown). Alternatively, or in addition, the manual mode selector 904 receives a model selection from a user via control information that is part of the input tokens submitted to the token-generating system 104.

Alternatively, or in addition, an automatic mode selector 906 automatically selects a mode based on one or more factors, as expressed in one or more input signals. For example, the automatic mode selector 906 will automatically switch to the third mode when a user invokes an application that demands a level of latency and/or resource utilization that cannot be satisfied by the first mode or the second mode. Alternatively, or in addition, the automatic mode selector 906 switches to the third mode upon discovering congestion or other network degradation in the computer network 806 (of FIG. 6) that is interfering with the delivery of timely responses, or when a network connection is lost entirely. Alternatively, or in addition, the automatic mode selector 906 switches from the third mode to the second mode or the first mode upon determining that the quality of responses has dropped below a prescribed threshold value. Different applications use different methods and threshold values to make mode switching decisions. Some environments, for example, use a machine-trained model that is trained to detect an extent to which responses contain hallucinations.

In the second mode, the draft language model 106 auto-regressively transforms a combination of prompt tokens 908 and guidance token information 910 (if any) into draft tokens 912. The target language model 108 transforms a combination of the prompt tokens 908 and the draft tokens 912 to target output tokens 914 and an instance of new guidance vector information 916 in a single forward pass. The target language model 108 includes a base target language model 918 which produces hidden state information as an output. A language model head 920 uses the hidden state information to produce the target output tokens 914. A vector-creating head 922 uses the hidden state information to produce guidance vector information 916. In some implementations, each head is implemented, at least in part, by a feed-forward neural network (e.g., a multi-layer perceptron). The language model head 920 can also use a Softmax function (which is a normalized exponential function) to compute probabilities based on logits produced by the feed-forward neural network.

In some implementations, the target language model 108 uses the architecture shown in FIG. 9 to produce a fixed number g guidance vectors, defined by an environment-specific configuration parameter. g can be any number, g≥1. In some implementations, the target language model 108 produces these g guidance vectors in a single pass. In other implementations, the target language model 108 performs its editing function in a single pass, but auto-regressively produces the g guidance vectors.

The same architecture described above is used to implement the first mode of FIG. 1 and the third mode of FIG. 6. In the first mode, the vector-creating head 922 produces no guidance vector information. In the third mode, the vector-creating head 922 produces guidance vector information only once, and the base target language model 918 performs no editing/verification function.

Other implementations vary the operation of the target-generating system 104 in different ways. In some implementations, in the second mode of operation shown in FIG. 4, the draft language model 106 uses the automatic mode selector 906 to assess the level of confidence of each set of draft tokens it generates. The token-generating system 104 consults the target language model 108 to verify the accuracy of the draft tokens for a case in which the level of confidence is above a prescribed threshold level. The token-generating system 104 does not consult the target language model 108 for a case in which the level of confidence is equal to or below the prescribed threshold level. Different implementations generate different measures of confidence. In one implementation, a training system trains the token-generating system 104 such that, in addition to producing draft tokens, the draft language model 106 produces a score (e.g., ranging from 0 to 1) that indicates whether it is appropriate to ask the target language model 108 to verify the accuracy of the draft tokens. Each training example used to train such a token-generating system 104 include prompt tokens fed to the draft language model 106, draft tokens produced by the draft language model 106, and a ground-truth label that indicates whether it is appropriate to interact with the target language model 108.

Alternatively, or in addition, other implementations make use of plural target language models. For instance, the target language models have different respective sizes, and/or the target language models have different respective skills for interpreting different classes of input tokens. The automatic mode selector 906 assesses the semantic content of each set of draft tokens in the context of prompt tokens which precede the set of draft tokens. In some implementations, the automatic mode selector 906 is able to perform the above-described function by transforming the set of draft tokens together and their preceding prompt tokens (which establish the context of the draft tokens) to a distributed vector in a vector space. The automatic model selector 906 then uses a classification model (e.g., implemented as a neural network) to map the distributed vector to an identity of the target language model that is best able to handle the set of draft tokens. A routing mechanism routes the draft tokens to the selected target language model. This constitutes a version of function calling in which a first language model (e.g., the draft language model) is configured to call a second language model (e.g., an appropriate target language model). The aptitude of any target language model is a function of its size and its skills, which, in turn, reflects its knowledge expressed by its machine-trained weights and the training examples used to produce those weights.

Alternatively, or in addition, the target language model 108 produces guidance vector information having a variable number of guidance vectors. In some implementations, the target language model 108 performs this function by producing a number f of initial guidance vectors (where f is fixed), and then uses a post-processing neural network to prune this number f of initial vectors by eliminating any vectors that convey redundant information. Such a pruning operation helps reduce the use of resources in the token-generating system 104; this is because reducing the number of tokens reduces the amount of memory, processing, and communication resources necessary to handle these tokens.

C. Illustrative Training and Evaluation Systems

Figure 10:
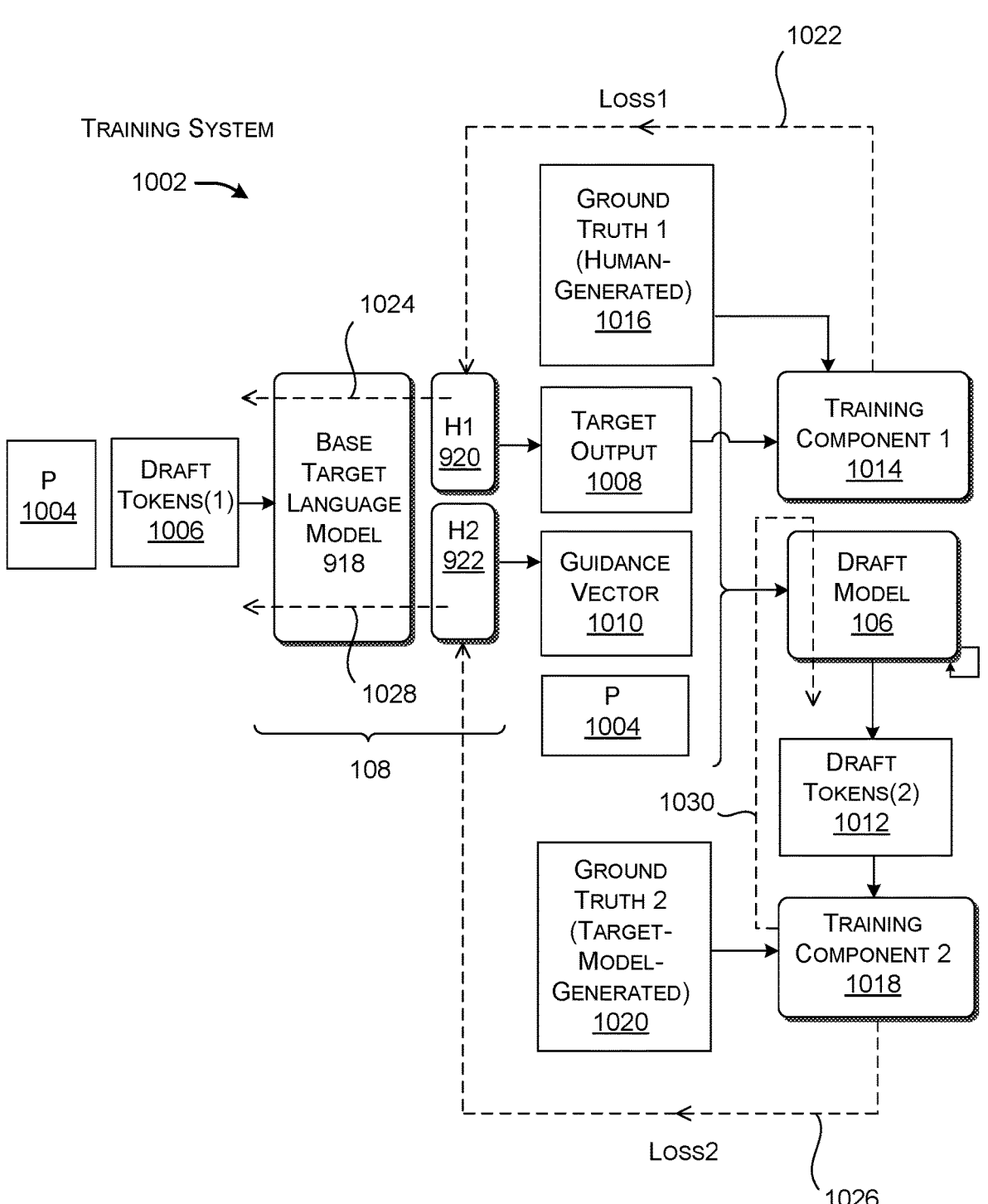
FIG. 10 shows a training system for training the token-generating system of FIGS. 1-6.

FIG. 10 shows an illustrative training system 1002 for training the token-generating system 104. The operation of the training system 1002 is set forth below in the context of the processing of a single training example, with respect to the second mode introduced in FIG. 4. In a forward pass, the base target language model 918 maps a combination of prompt tokens 1004 and draft tokens 1006 into hidden state information (not shown). The language model head (H1) 920 transforms the hidden state information to target output tokens 1008, e.g. based on the logic 302 described with reference to FIG. 3. The vector-creating head (H2) 922 transforms the hidden state information to guidance vector information 1010. The draft language model 106 transforms the prompt tokens 1004, the target output tokens 1008, and the guidance vector information 1010 to new draft tokens 1012.

A first training component 1014 calculates the difference between the target output tokens 1008 and first ground-truth information 1016. A second training component 1018 calculates the difference between the draft tokens 1012 and second ground-truth information 1020. Overall, the training components (1014, 1018) can use any loss equations to calculate measures for loss for an entire set of training example, such as cross entropy. In some implementations, the first ground-truth information 1016 is text that is verified by a human reviewer (or reviewers) as being a correct response to the prompt tokens 1004. In some implementations, the second ground-truth information 1020 is text that is auto-regressively produced by the target language model 108. The above processing completes the forward pass for one training example.

In the backward pass, the first training component 1014 propagates a first loss measure to the language model head 920, as shown in path 1022. The training system 1002 then propagates this loss measure backward through the layers of the language model head 920 and base target language model 918, as shown by path 1024. The second training component 1018 propagates a second loss measure to the vector-creating head 922, as represented by path 1026. The training system 1002 then propagates this loss measure backward through the layers of the vector-creating head 922 and the base target language model 918, as represented by path 1028. Further, optionally, the second loss measure is propagated backward through the layers of the draft language model 106, as represented by path 1030. The training system 1002 adjusts weights on a layer by layer basis using the loss measure received by each individual layer.

The flow described above also applies to training examples used to train the first mode (shown in FIG. 1) and the third mode (shown in FIG. 6). But in the first mode, the guidance vector information 1008 is not generated. In the third mode, the guidance vector information 1008 is generated once at the outset of the processing of query.

In some implementations, the training system 1002 trains the target language model 108 at the same frequency as the draft language model 106. In other implementations, the training system 1002 trains the target language model 108 more frequently than the draft language model 106. In other implementations, the training system 1002 only updates the target language model 108. In either of the last two cases, the token-generating system 104 is still effective in propagating knowledge from the target language model 108 to the draft language model 106 via the guidance vector information.

Figure 11:
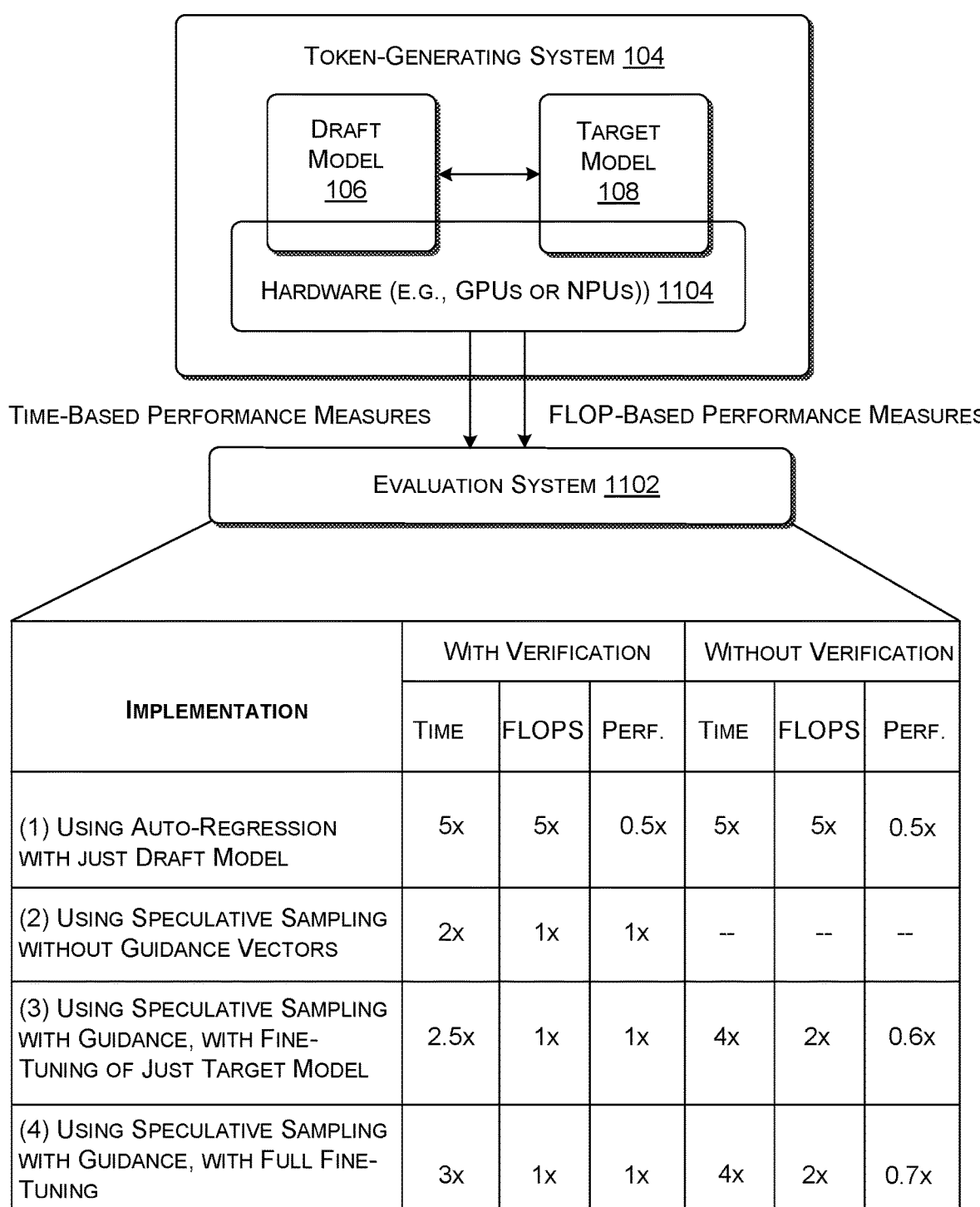
FIG. 11 shows an evaluation system for evaluating the performance of the token-generating system of FIGS. 1-6, and illustrative results of an evaluation.

FIG. 11 shows an evaluation system 1102 that evaluates the performance of the token-generating system 104 for different approaches. The token-generating system 104 includes the draft language model 106 and the target language model 108, which are implemented by the same physical system or different physical systems. Any environment-specific hardware 1104 is used to run the token-generating system 104, including any combination of central processing units (CPUs), graphics processing units (GPU), neural processing units (NPUs), etc. The evaluation system 1102 interacts with the hardware 1104 to receive at least two measures of performance: FLOP-based performance measures and time-base performance measures. A flop-based performance measure describes the total number of floating point operations (FLOPs) that are performed in the course of processing a query, across both the draft language model 106 and the target language model 108. A time-based performance measure describes the amount of time that is required to process the query, end to end.

In the example of FIG. 11, the evaluation system 1102 compares the performance of four approaches. These include: (Case 1) the use of the draft language model 106 alone to produce all output tokens using auto-regression; (Case 2) the use of speculative sampling, per the first mode, to generate output tokens, without the use of guidance vector information; (Case 3) the generation of output tokens using speculative sampling and guidance vector information, and with fine-tuning of just the target language model 108; and (Case 4) the generation of output tokens using speculative sampling and guidance vector information, with fine-tuning of the both the target language model 108, and the draft language model 106. The "with verification" category or mode describes a scenario in which the target language model 108 is used to verify the correctness of draft tokens produced by the draft language model 106 (e.g., per the second mode shown in FIG. 4). The "without verification" category or mode describes a scenario in which the target language model 108 is not used to verify the correctness of draft tokens produced by the draft language model (e.g., per the third mode shown in FIG. 6). In these experiments, the size of the draft language model 106 is 125 M parameters and size of the target language model is 6.7 billion parameters.

The evaluation measures in the table show the improvement of each designated approach compared to the use of the target language model 108 alone to auto-regressively produce tokens (which constitutes a base case), with respect to different measures of improvement. That is, a first column makes this assessment with respect to latency (end-to-end time). A second column makes this assessment with respect to the number of FLOPS. A third column makes this assessment with respect to any downstream performance measure, including any of an accuracy/quality score, F1 score, BLEU score, etc. Different applications gauge accuracy/quality in different ways. For example, in a dialogue system, one downstream performance measure expresses the fraction of responses to queries that match predetermined ground-truth (correct) answers. Other implementations use custom machine-trained models to determine the presence of hallucinations in the generated responses.

First consider the category of results under the heading "With Verification." FIG. 1 shows that use of the draft language model 106 by itself (Case 1) is fastest (operating 5× faster than the base case), but produces the lowest quality results (that is, producing responses that are half as accurate as the base case). Among the remaining modes, for the case of the "With Verification" category, Case 4 that uses full fine-tuning is the fastest (being 3× faster than the base case), with equal accuracy to the base case. Case 3 is also faster than the base case, and also Case 2. In all cases, these results generally confirm that the use of guidance vector information expedites the generation of output tokens.

Next consider the category of results under the heading "Without Verification." The same trends described above apply to this category. As evidenced by the FLOP-based measure, this category reduces the amount of computations that are performed compared to the "With Verification" category, and consequently reduces the consumption of resources compared to the "With Verification" category. But the "Without Verification" mode also generally produces responses with inferior quality compared to the "With Verification" Category. Further note that Case 3 and Case 4 of the "Without Verification" category offer improvements in speed (latency) of 4× over the counterpart cases of the "With Verification" category, but, as noted, with a loss of accuracy compared to the counterpart cases of the "With Verification" category.

FIG. 12 shows the optimal draft size for two target language model sizes (1.3B, and 6.7B). The draft size refers to the number of draft tokens produced by the draft language model 106. Target model size refers to the number of parameters used by the target language model 108. Optimality is gauged using any performance measure, such as any of the performance measure identified above with respect to FIG. 11. Generally, the use of guidance information allows for the use of longer draft sequences, as does increasing the size of the target language model 108.

D. Illustrative Language Model

Figure 13:
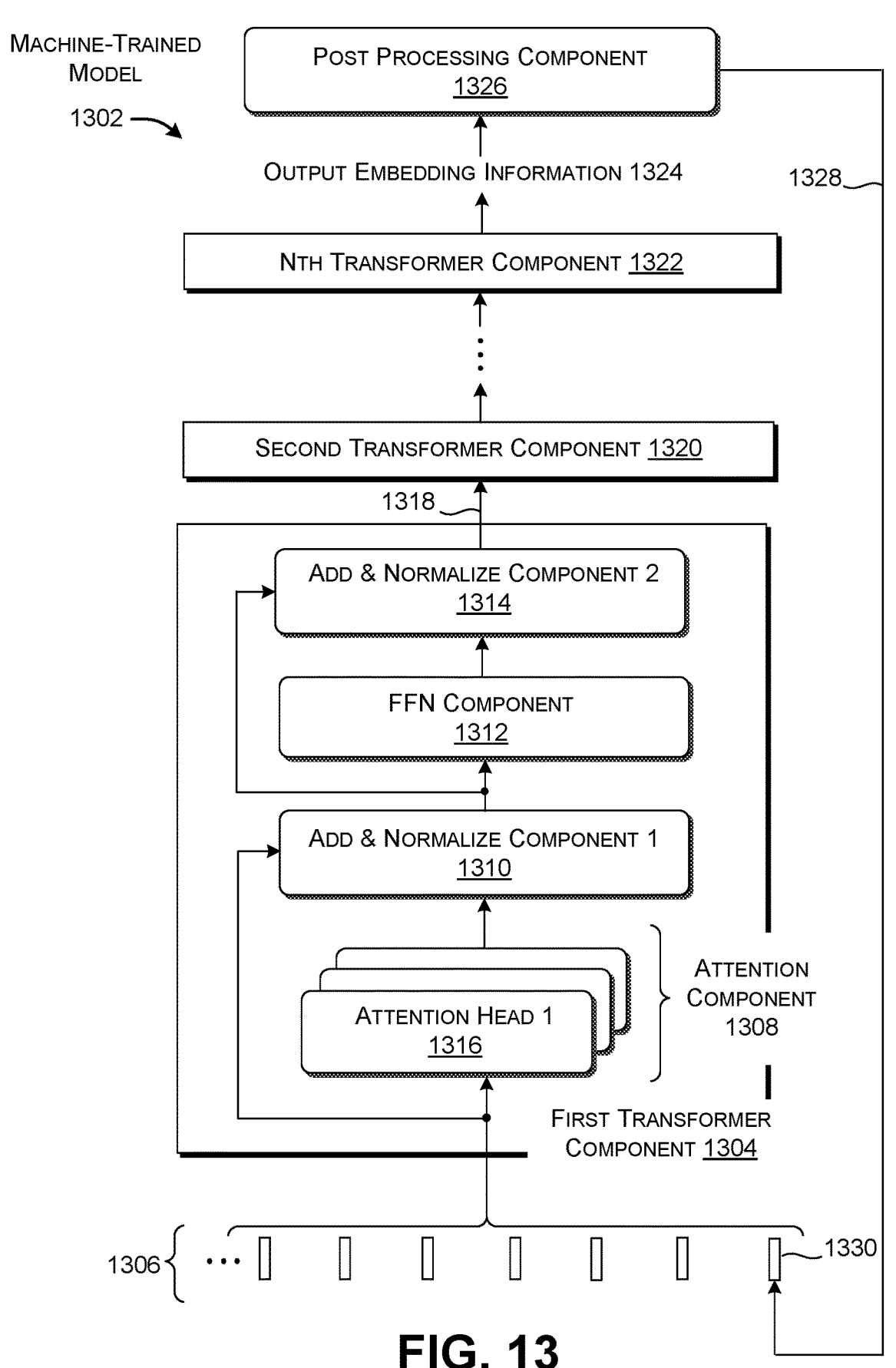
FIG. 13 shows an illustrative language model for implementing various functions of the token-generating system of FIGS. 1-6.

FIG. 13 shows a transformer-based language model ("language model") 1302 for implementing any language model of the token-generating system 104, including the draft language model 106 and the target language model 108. The language model 1302 is composed, in part, of a pipeline of transformer components, including a first transformer component 1304. FIG. 13 provides details regarding one way to implement the first transformer component 1304. Although not specifically illustrated, other transformer components of the language model 1302 have the same architecture and perform the same functions as the first transformer component 1304 (but are governed by separate sets of weights).

The language model 1302 commences its operation with the receipt of input information, such as a passage of text. The prompt includes a series of linguistic tokens. In some examples, a "token" refers to a unit of text having any granularity, such as an individual word, a word fragment produced by byte pair encoding (BPE), a character n-gram, a word fragment identified by the WordPiece or SentencePiece algorithm, etc. To facilitate explanation, assume that each token corresponds to a complete word. The principles set forth herein, however, are not limited to the processing of text information; in other examples, the language model 1302 operates on any of: audio information, image information, video information, sensor information, and so on, or any combination thereof.

Next, an embedding component (not shown) maps the sequence of tokens into respective token embeddings. For example, the embedding component produces one-hot vectors that describe the tokens, and then maps the one-hot vectors into the token embeddings using a machine-trained linear transformation. In some implementations, for the case of the draft language model 106, the guidance vectors of the guidance vector information are already in the embedding space used by the embedding component. In these implementations, the embedding component accepts the guidance vector information in its original form without further transforming it. In some implementations, the embedding component prepends the guidance vectors to the beginning of the embedding vectors associated with text tokens.

The embedding component then adds position information (and, in some cases, segment information) to the respective token embeddings to produce position-supplemented embedding vectors 1306. The position information added to each token embedding describes the embedding vector's position in the sequence of token embeddings.

The first transformer component 1304 operates on the position-supplemented embedding vectors 1306. In some implementations, the first transformer component 1304 includes, in order, an attention component 1308, a first add-and-normalize component 1310, a feed-forward neural network (FFN) component 1312, and a second add-and-normalize component 1314.

The attention component 1308 determines how much emphasis should be placed on parts of input information when interpreting other parts of the input information. Consider, for example, a sentence that reads: "I asked the professor a question, but he could not answer it." When interpreting the word "it," the attention component 1308 will determine how much weight or emphasis should be placed on each of the words of the sentence. The attention component 1308 will find that the word "question" is most significant.

The attention component 1308 performs attention analysis using the following equation:

$$\text{Attention}(Q, K, V) = \text{softmax}\left(\frac{QK^T}{\sqrt{d_k}}\right)V. \tag{1}$$

The attention component 1308 produces query information Q by multiplying the position-supplemented embedding vectors 1306 by a query weighting matrix $W^Q$. Similarly, the attention component 1308 produces key information K and value information V by multiplying the position-supplemented embedding vectors 1306 by a key weighting matrix $W^K$ and a value weighting matrix $W^V$, respectively. To execute Equation (1), the attention component 1308 takes the dot product of Q with the transpose of K, and then divides the dot product by a scaling factor $\sqrt{d}$, to produce a scaled result. The symbol d represents the dimensionality of Q and K. The attention component 1308 takes the Softmax (normalized exponential function) of the scaled result, and then multiplies the result of the Softmax operation by V, to produce attention output information. More generally stated, the attention component 1308 determines how much emphasis should be placed on each part of input embedding information when interpreting other parts of the input embedding information, and when interpreting the same part. In some cases, the attention component 1308 is said to perform masked attention insofar as the attention component 1308 masks output token information that, at any given time, has not yet been determined. Background information regarding the general concept of attention is provided in Vaswani, et al., "Attention Is All You Need," in 31st Conference on Neural Information Processing Systems (NIPS 2017), 2017, 9 pages.

Note that FIG. 13 shows that the attention component 1308 is composed of plural attention heads, including a representative attention head 1316. Each attention head performs the computations specified by Equation (1), but with respect to a particular representational subspace that is different than the subspaces of the other attention heads. To accomplish this operation, the attention heads perform the computations described above using different respective sets of query, key, and value weight matrices. Although not shown, the attention component 1308 concatenates the output results of the attention component's separate attention heads, and then multiplies the results of this concatenation by another weight matrix $W^O$.

The add-and-normalize component 1310 includes a residual connection that combines (e.g., sums) input information fed to the attention component 1308 with the output information generated by the attention component 1308. The add-and-normalize component 1310 then normalizes the output information generated by the residual connection, e.g., by layer-normalizing values in the output information based on the mean and standard deviation of those values, or by performing root-mean-squared normalization. The other add-and-normalize component 1314 performs the same functions as the first-mentioned add-and-normalize component 1310. The FFN component 1312 transforms input information to output information using a feed-forward neural network having any number of layers.

The first transformer component 1304 produces output embedding information 1318. A series of other transformer components (1320, . . . , 1322) perform the same functions as the first transformer component 1304, each operating on output embedding information produced by its immediately preceding transformer component. Each transformer component uses its own level-specific set of machine-trained weights. The final transformer component 1322 in the language model 1302 produces final output embedding information 1324.

A post-processing component 1326 performs post-processing operations based on the final output embedding information 132. For example, with respect to the draft language model 106, the post-processing component 1326 performs a machine-trained linear transformation on the final output embedding information 1324, and processes the results of this transformation using a Softmax component (not shown). The language model 1302 uses the output of the post-processing component 1326 to predict the next token in the input sequence of tokens. In some applications, the language model 1302 performs this task using a greedy selection approach (e.g., by selecting the token having the highest probability), or by using the beam search algorithm (e.g., by traversing a tree that expresses a search space of candidate next tokens). In the case of the target language model 108, the post-processing component 1326 represents the heads (920, 922) described above with reference to FIG. 9. The two heads (920, 922) perform the functions described above with reference to FIG. 9. The layers preceding the post-processing component 1326 represent the base target language model 918 of FIG. 9.

When serving the role of the draft language model 106, the language model 1302 operates in an auto-regressive manner, as indicated by the loop 1328. To operate in this way, the language model 1302 appends a predicted token to the end of the sequence of input tokens, to provide an updated sequence of tokens. The predicted token leads to the production of a new position-supplemented vector 1330. In a next pass, the language model 1302 processes the updated sequence of position-supplemented vectors to generate a next predicted token. The language model 1302 repeats the above process until it generates a specified stop token.

When serving the role of the target language model 108, the language model 1302 produces probability information for each of the draft tokens that is fed to it in a single forward pass. For example, assume that the draft tokens include tokens A, B, C, D, and E. The language model 1302 calculates the likelihood that the token A will follow the preceding prompt tokens, the likelihood that the token B will follow token A, the likelihood that the token C will follow the token B, and so on. It performs this operation by considering different tokens as the last-occurring token in a sequence of tokens.

The above-described implementation of the language model 1302 relies on a decoder-only architecture. Other implementations of the language model 1302 use an encoder-decoder transformer-based architecture. Here, a transformer-based decoder receives encoder output information produced by a transformer-based encoder, together with decoder input information. The encoder output information specifically includes key-value (KV) information that serves an input to the attention components of the decoder (except the first transformer component).

In some implementations, the language model 1302 is based on a pre-trained language model. One example of publicly-available pre-trained language model is described in Touvron, et al., "LLaMA: Open and Efficient Foundation Language Models," arXiv, arXiv:2302.13971v1 [cs.CL], Feb. 27, 2023, 27 pages. Another example of a publicly-available pre-trained model language model is the BLOOM model described in Scao, et al., "BLOOM: A 176B-Parameter Open-Access Multilingual Language Model," arXiv, arXiv:2211.05100v2 [cs.CL], Dec. 11, 2022, 62 pages. The training system 1002 of FIG. 10 then fine-tunes the pre-trained language model.

Other implementations of the language model 1302 use other kinds of machine-trained models besides, or in addition to, the particular transformer-based architecture shown in FIG. 13. The other machine-trained models include any of convolutional neural networks (CNNs), recursive neural networks (RNNs), fully-connected feed-forward neural networks (FFNS), stable diffusion models, etc., or any combination thereof.

E. Illustrative Processes

FIGS. 14-17 show three processes that represent an overview of the operation of the technology set forth in Sections A-D. Each of the processes is expressed as a series of operations performed in a particular order. But the order of these operations is merely representative, and the operations are capable of being varied in other implementations. Further, any two or more operations described below are capable of being performed in a parallel manner. In one implementation, the blocks shown in the processes that pertain to processing-related functions are implemented by the computing equipment described in connection with FIGS. 17 and 18.

More specifically, FIG. 14 shows a process 1402 for accelerating generation of output tokens using a target language model (e.g., the target language model 108), which operates in cooperation with a draft language model (e.g., the draft language model 106). In block 1404, the target-language model receives a set of draft tokens produced by the draft language model based on, at least in part, prompt tokens provided to the draft language model. The target language model uses more parameters and is more accurate compared to the draft language model. Further, the target language model consumes more memory and processing resources compared to the draft language model, and the target language model is slower in operation compared to the draft language model. In block 1406, the target language model produces one or more target output tokens based on the prompt tokens and the set of draft tokens. The one or more target output tokens includes zero, one, or more draft tokens chosen from among the set of draft tokens, and an additional target output token which is predicted by the target language model to follow the zero, one, or more draft tokens that are selected. In block 1408, the target language model generates guidance vector information based on the prompt tokens and the set of draft tokens. In block 1410, the target language model forwards the one or more target output tokens and the guidance vector information to the draft language model, for use by the draft language model in generating updated draft tokens.

FIG. 15 shows a process 1502 for using a draft language model (e.g., the draft language model 106) to accelerate generation of output tokens using a target language model (e.g., the target language model 108). In block 1504, the draft language model receives a set of target output tokens produced by the target language model, and guidance vector information produced by the target language model. In block 1506, the draft language model transforms prompt tokens, the set of target output tokens, and the guidance vector information into draft tokens. The draft language model uses fewer parameters and is less accurate compared to the target language model. Further, the draft language model consumes less memory and processing resources compared to the target language model, and the draft language model is faster in operation compared to the target language model. In block 1508, the draft language model sends the draft tokens to the target language model, for use by the target language model in producing an updated set of target output tokens and updated guidance vector information.

FIG. 16 shows a process 1602 for training the token-generating system 104. In block 1604, the a target language model (e.g., the target language model 108) receives a set of draft tokens produced by a draft language model (e.g., the draft language model 106) based on, at least in part, prompt tokens provided to the draft language model. The target language model uses more parameters and is more accurate compared to the draft language model. Further, the target language model consumes more memory and processing resources compared to the draft language model, and is slower in operation compared to the draft language model. In block 1606, the target language model 108 transforms one or more target output tokens based on the prompt tokens and the set of draft tokens. The one or more target output tokens includes zero, one, or more draft tokens chosen from among the set of draft tokens, and an additional target output token which is predicted by the target language model to follow the zero, one, or more draft tokens that are selected. In block 1608, the target language model 108 generates guidance vector information based on the prompt tokens and the set of draft tokens. In block 1610, the draft language model 106 transforms the prompt tokens, the one or more target output tokens, and the guidance vector information to updated draft tokens. The target language model is trained based on a first loss measure that depends on a difference between first ground-truth information and the one or more target output tokens, and a second loss measure that depends on a difference between the updated draft tokens and second ground-truth information.

F. Illustrative Computing Functionality

FIG. 17 shows computing equipment 1702 that, in some implementations, is used to implement the token-generating system 104. The computing equipment 1702 includes a set of local devices 1704 coupled to a set of servers 1706 via a computer network 1708. Each local device corresponds to any type of computing device, including any of a desktop computing device, a laptop computing device, a handheld computing device of any type (e.g., a smartphone or a tablet-type computing device), a mixed reality device, an intelligent appliance, a wearable computing device (e.g., a smart watch), an Internet-of-Things (IoT) device, a gaming system, an immersive "cave," a media device, a vehicleborne computing system, any type of robot computing system, a computing system in a manufacturing system, etc. In some implementations, the computer network 1708 is implemented as a local area network, a wide area network (e.g., the Internet), one or more point-to-point links, or any combination thereof.

The bottom-most overlapping box in FIG. 17 indicates that the functionality of the token-generating system 104 is capable of being spread across the local devices 1704 and/or the servers 1706 in any manner. In one example, the token-generating system 104 is entirely implemented by one or more local devices. In another example, the functions of the token-generating system 104 are entirely implemented by the servers 1706. Here, a user is able to interact with the servers 1706 via a browser application or other interface mechanism running on a local device. FIG. 7 shows an example of this kind of implementation. In other examples, some of the functions of the token-generating system 104 are implemented by a local device, and other functions of the token-generating system 104 are implemented by the servers 1706. FIG. 8 shows an example of this implementation.

FIG. 18 shows a computing system 1802 that, in some implementations, is used to implement any aspect of the mechanisms set forth in the above-described figures. For instance, in some implementations, the type of computing system 1802 shown in FIG. 18 is used to implement any local computing device or any server shown in FIG. 17. In all cases, the computing system 1802 represents a physical and tangible processing mechanism.

The computing system 1802 includes a processing system 1804 including one or more processors. The processor(s) include one or more central processing units (CPUs), and/or one or more graphics processing units (GPUs), and/or one or more application specific integrated circuits (ASICs), and/or one or more neural processing units (NPUs), and/or one or more tensor processing units (TPUs), etc. More generally, any processor corresponds to a general-purpose processing unit or an application-specific processor unit.

The computing system 1802 also includes computer-readable storage media 1806, corresponding to one or more computer-readable media hardware units. The computer-readable storage media 1806 retains any kind of information 1808, such as machine-readable instructions, settings, model weights, and/or other data. In some implementations, the computer-readable storage media 1806 includes one or more solid-state devices, one or more hard disks, one or more optical disks, etc. Any instance of the computer-readable storage media 1806 uses any technology for storing and retrieving information. Further, any instance of the computer-readable storage media 1806 represents a fixed or removable unit of the computing system 1802. Further, any instance of the computer-readable storage media 1806 provides volatile and/or non-volatile retention of information. The specific term "computer-readable storage medium" or "storage device" expressly excludes propagated signals in transit; a computer-readable storage medium or storage device is "non-transitory" in this regard.

The computing system 1802 utilizes any instance of the computer-readable storage media 1806 in different ways. For example, in some implementations, any instance of the computer-readable storage media 1806 represents a hardware memory unit (such as random access memory (RAM)) for storing information during execution of a program by the computing system 1802, and/or a hardware storage unit (such as a hard disk) for retaining/archiving information on a more permanent basis. In the latter case, the computing system 1802 also includes one or more drive mechanisms

1810 (such as a hard drive mechanism) for storing and retrieving information from an instance of the computer-readable storage media 1806.

In some implementations, the computing system 1802 performs any of the functions described above when the processing system 1804 executes computer-readable instructions stored in any instance of the computer-readable storage media 1806. For instance, in some implementations, the computing system 1802 carries out computer-readable instructions to perform each block of the processes described with reference to FIGS. 14-17. FIG. 18 generally indicates that hardware logic circuitry 1812 includes any combination of the processing system 1804 and the computer-readable storage media 1806.

In addition, or alternatively, the processing system 1804 includes one or more other configurable logic units that perform operations using a collection of logic gates. For instance, in some implementations, the processing system 1804 includes a fixed configuration of hardware logic gates, e.g., that are created and set at the time of manufacture, and thereafter unalterable. In addition, or alternatively, the processing system 1804 includes a collection of programmable hardware logic gates that are set to perform different application-specific tasks. The latter category of devices includes programmable array logic devices (PALs), generic array logic devices (GALs), complex programmable logic devices (CPLDs), field-programmable gate arrays (FPGAs), etc. In these implementations, the processing system 1804 effectively incorporates a storage device that stores computer-readable instructions, insofar as the configurable logic units are configured to execute the instructions and therefore embody or store these instructions.

In some cases (e.g., in the case in which the computing system 1802 represents a user computing device), the computing system 1802 also includes an input/output interface 1814 for receiving various inputs (via input devices 1816), and for providing various outputs (via output devices 1818). Illustrative input devices include a keyboard device, a mouse input device, a touchscreen input device, a digitizing pad, one or more static image cameras, one or more video cameras, one or more depth camera systems, one or more microphones, a voice recognition mechanism, any position-determining devices (e.g., GPS devices), any movement detection mechanisms (e.g., accelerometers and/or gyroscopes), etc. In some implementations, one particular output mechanism includes a display device 1820 and an associated graphical user interface presentation (GUI) 1822. The display device 1820 corresponds to a liquid crystal display device, a light-emitting diode display (LED) device, a cathode ray tube device, a projection mechanism, etc. Other output devices include a printer, one or more speakers, a haptic output mechanism, an archival mechanism (for storing output information), etc. In some implementations, the computing system 1802 also includes one or more network interfaces 1824 for exchanging data with other devices via one or more communication conduits 1826. One or more communication buses 1828 communicatively couple the above-described units together.

The communication conduit(s) 1826 is implemented in any manner, e.g., by a local area computer network, a wide area computer network (e.g., the Internet), point-to-point connections, or any combination thereof. The communication conduit(s) 1826 include any combination of hardwired links, wireless links, routers, gateway functionality, name servers, etc., governed by any protocol or combination of protocols.

FIG. 18 shows the computing system 1802 as being composed of a discrete collection of separate units. In some cases, the collection of units corresponds to discrete hardware units provided in a computing device chassis having any form factor. FIG. 18 shows illustrative form factors in its bottom portion. In other cases, the computing system 1802 includes a hardware logic unit that integrates the functions of two or more of the units shown in FIG. 18. For instance, in some implementations, the computing system 1802 includes a system on a chip (SoC or SOC), corresponding to an integrated circuit that combines the functions of two or more of the units shown in FIG. 18.

The following summary provides a set of illustrative examples of the technology set forth herein.

(A1) According to one aspect, a method (e.g., the process 1402) is described for accelerating generation of output tokens using a target language model (e.g., the target language model 108), which operates in cooperation with a draft language model (e.g., the draft language model 106). The method includes receiving (e.g., in block 1404), by the target language model, a set of draft tokens produced by the draft language model based on, at least in part, prompt tokens provided to the draft language model. The target language model uses more parameters and is more accurate compared to the draft language model, the target language model consumes more memory and processing resources compared to the draft language model, and the target language model is slower in operation compared to the draft language model. The method further includes producing (e.g., in block 1406), using the target language model, one or more target output tokens based on the prompt tokens and the set of draft tokens. The one or more target output tokens include zero, one, or more draft tokens chosen from among the set of draft tokens, and an additional target output token which is predicted by the target language model to follow the zero, one, or more draft tokens that are selected. The method further includes: generating (e.g., in block 1408), using the target language model, guidance vector information based on the prompt tokens and the set of draft tokens; and forwarding (e.g., in block 1410) the one or more target output tokens and the guidance vector information to the draft language model, for use by the draft language model in generating updated draft tokens.

(A2) According to some implementations of the method of A1, the target language model includes a multi-layer neural network that applies an attention operation to input tokens that are input to the target language model, and the draft language model is another multi-layer neural network that applies an attention operation to input tokens that are input to the draft language model.

(A3) According to some implementations of the methods of A1 or A2, a server system implements the target language model and a local system implements the local language model, the server system being accessible to the local system via a computer network.

(A4) According to some implementations of the method of A1 or A2, both the target language model and the draft language model are implemented by a same system.

(A5) According to some implementations of any of the methods of A1-A5, the producing accepts a particular draft token of the zero, one, or more draft tokens upon determining that a probability generated by the target language model for the particular draft token is greater than a probability generated by the draft language model for the particular draft token.

(A6) According to some implementations of any of the methods of A1-A5, the target language model operates by:

transforming the prompt tokens and the set of draft tokens to hidden state information using a base target language model; transforming the hidden state information to output token probability information, on basis of which the one or more target output tokens are produced; and transforming the hidden state information to the guidance vector information.

(A7) According to some implementations of any of the methods of A1-A6, the method further includes producing the one or more target output tokens in a single forward pass of the target language model.

(A8) According to some implementations of any of the methods of A1-A7, the draft tokens in the set of draft tokens that are produced auto-regressively by the draft language model.

(A9) According to some implementations of any of the methods of A1-A8, the method further includes transforming, using the draft language model, the prompt tokens, the one or more target output tokens, and the guidance vector information to the updated draft tokens. The target language model is trained based on a first loss measure that depends on a difference between first ground-truth information and the one or more target output tokens, and a second loss measure that depends on a difference between second ground-truth information and the updated draft tokens.

(A10) According to some implementations of any of the methods of A1-A9, the draft language model is also trained based on the second loss measure.

(A11) According to some implementations of the method of A9, the first ground-truth information is text that is manually specified by a human reviewer as being correct, and wherein the second ground-truth information is text auto-regressively generated by the target language model.

(A12) According to some implementations of the method A9, the method further includes evaluating improvements of a cooperative combination of the draft language model and the target language model over another language model based on: a number of floating point operations that are performed by the target language model and the draft language model, and a latency of the target language model; and a number of floating point operations that are performed by said another language model and a latency of said another language model.

(A13) According to some implementations of any of the methods of A1-A12, the method further includes switching to a mode in which the target language model is asked by the draft language model to generate an instance of guidance vector information for initial prompt tokens, and wherein generation of output tokens thereafter takes place using the draft language model independent of interaction with the target language model.

(B1) According to another aspect, a method (e.g., the process 1502) is described for using a draft language model (e.g., the draft language model 106) to accelerate generation of output tokens using a target language model (e.g., the target language model 108). The method includes receiving (e.g., in block 1504) a set of target output tokens produced by the target language model, and guidance vector information produced by the target language model, and transforming (e.g., in block 1506) prompt tokens, the set of target output tokens, and the guidance vector information into draft tokens. The draft language model uses fewer parameters and is less accurate compared to the target language model, the draft language model consumes less memory and processing resources compared to the target language model, and the draft language model is faster in operation compared to the target language model. The method further includes sending the draft tokens to the target language model, for use by the target language model in producing an updated set of target output tokens and updated guidance vector information.

(C1) According to another aspect, a method (e.g., the process 1602) is described for training a token-generating stem (e.g., the token-generating system 104 that includes a target language model (e.g., the target language model 108) and a draft language model (e.g., the draft language model 106). The method includes receiving (e.g., in block 1604), by a target language model, a set of draft tokens produced by a draft language model based on, at least in part, prompt tokens provided to the draft language model. The target language model use more parameters and is more accurate compared to the draft language model, the target language model consumes more memory and processing resources compared to the draft language model, and the target language model is slower in operation compared to the draft language model. The method further includes producing (e.g., in block 1606), using the target language model, one or more target output tokens based on the prompt tokens and the set of draft tokens. The one or more target output tokens include zero, one, or more draft tokens chosen from among the set of draft tokens, and an additional target output token which is predicted by the target language model to follow the zero, one, or more draft tokens that are selected. The method further includes generating (e.g., in block 1608), using the target language model, guidance vector information based on the prompt tokens and the set of draft tokens, and transforming (e.g., in block 1610), using the draft language model, the prompt tokens, the one or more target output tokens, and the guidance vector information to updated draft tokens. The target language model is trained based on a first loss measure that depends on a difference between first ground-truth information and the one or more target output tokens, and a second loss measure that depends on a difference between second ground-truth information and the updated draft tokens.

In yet another aspect, some implementations of the technology described herein include a computing system (e.g., the computing system 1802) that includes a processing system (e.g., the processing system 1804) having a processor. The computing system also includes a storage device (e.g., the computer-readable storage media 1806) for storing computer-readable instructions (e.g., the information 1808). The processing system executes the computer-readable instructions to perform any of the methods described herein (e.g., any individual method of the methods of A1-A13, B1, and C1)

In yet another aspect, some implementations of the technology described herein include a computer-readable storage medium (e.g., the computer-readable storage media 1806) for storing computer-readable instructions (e.g., the information 1808). A processing system (e.g., the processing system 1804) executes the computer-readable instructions to perform any of the operations described herein (e.g., the operations in any individual method of the methods of A1-A13, B1, and C1).

More generally stated, any of the individual elements and steps described herein are combinable into any logically consistent permutation or subset. Further, any such combination is capable of being manifested as a method, device, system, computer-readable storage medium, data structure, article of manufacture, graphical user interface presentation, etc. The technology is also expressible as a series of means-plus-format elements in the claims, although this format should not be considered to be invoked unless the phrase "means for" is explicitly used in the claims.

This description may have identified one or more features as optional. This type of statement is not to be interpreted as an exhaustive indication of features that are to be considered optional; generally, any feature is to be considered as an example, although not explicitly identified in the text, unless otherwise noted. Further, any mention of a single entity is not intended to preclude the use of plural such entities; similarly, a description of plural entities in the specification is not intended to preclude the use of a single entity. As such, a statement that an apparatus or method has a feature X does not preclude the possibility that it has additional features. Further, any features described as alternative ways of carrying out identified functions or implementing identified mechanisms are also combinable together in any combination, unless otherwise noted.

In terms of specific terminology, the phrase "configured to" encompasses various physical and tangible mechanisms for performing an identified operation. The mechanisms are configurable to perform an operation using the hardware logic circuitry 1812 of FIG. 18. The term "logic" likewise encompasses various physical and tangible mechanisms for performing a task. For instance, each processing-related operation illustrated in the flowcharts of FIGS. 14-17 corresponds to a logic component for performing that operation.

Further, the term "plurality" or "plural" or the plural form of any term (without explicit use of "plurality" or "plural") refers to two or more items, and does not necessarily imply "all" items of a particular kind, unless otherwise explicitly specified. The term "at least one of" refers to one or more items; reference to a single item, without explicit recitation of "at least one of" or the like, is not intended to preclude the inclusion of plural items, unless otherwise noted. Further, the descriptors "first," "second," "third," etc. are used to distinguish among different items, and do not imply an ordering among items, unless otherwise noted. The phrase "A and/or B" means A, or B, or A and B. The phrase "any combination thereof" refers to any combination of two or more elements in a list of elements. Further, the terms "comprising," "including," and "having" are open-ended terms that are used to identify at least one part of a larger whole, but not necessarily all parts of the whole. A "set" is a group that includes one or more members. The phrase "A corresponds to B" means "A is B" in some contexts. The term "prescribed" is used to designate that something is purposely chosen according to any environment-specific considerations. For instance, a threshold value or state is said to be prescribed insofar as it is purposely chosen to achieve a desired result. "Environment-specific" means that a state is chosen for use in a particular environment. Finally, the terms "exemplary" or "illustrative" refer to one implementation among potentially many implementations.

In closing, the functionality described herein is capable of employing various mechanisms to ensure that any user data is handled in a manner that conforms to applicable laws, social norms, and the expectations and preferences of individual users. For example, the functionality is configurable to allow a user to expressly opt in to (and then expressly opt out of) the provisions of the functionality. The functionality is also configurable to provide suitable security mechanisms to ensure the privacy of the user data (such as data-sanitizing mechanisms, encryption mechanisms, and/or password-protection mechanisms).

Further, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for accelerating generation of output tokens using a target language model, which operates in cooperation with a draft language model, comprising:

receiving, by the target language model, a set of draft tokens produced by the draft language model based on, at least in part, prompt tokens provided to the draft language model;

wherein the target language model and the draft language model are two different neural networks, and wherein the target language model has more parameters and is more accurate compared to the draft language model, and wherein the target language model consumes more memory and processing resources compared to the draft language model, and wherein the target language model is slower in operation compared to the draft language model;

producing, using a first head neural network of the target language model, one or more target output tokens based on the prompt tokens and the set of draft tokens, the one or more target output tokens including zero, one, or more draft tokens chosen from among the set of draft tokens, and an additional target output token which is predicted by the target language model to follow the zero, one, or more draft tokens that are selected;

generating, using a second head neural network of the target language model, guidance vector information based on the prompt tokens and the set of draft tokens, the second head neural network being different than the first head neural network; and forwarding the one or more target output tokens and the guidance vector information to the draft language model, a combination of the prompt tokens, the one or more target output tokens, and the guidance vector information being used by the draft language model as input tokens to be transformed into updated draft tokens.

2. The method of claim 1, wherein the target language model applies an attention operation to input tokens that are input to the target language model, and the draft language model applies an attention operation to input tokens that are input to the draft language model.

3. The method of claim 1, wherein a server system implements the target language model and a local system implements the local language model, the server system being accessible to the local system via a computer network.

4. The method of claim 1, wherein both the target language model and the draft language model are implemented by a same system.

5. The method of claim 1, wherein the producing accepts a particular draft token of the zero, one, or more draft tokens upon determining that a probability generated by the target language model for the particular draft token is greater than a probability generated by the draft language model for the particular draft token.

6. The method of claim 1, wherein the target language model operates by:

transforming the prompt tokens and the set of draft tokens to hidden state information using a base target language model;

transforming the hidden state information to output token probability information using the first head neural network, on basis of which the one or more target output tokens are produced; and transforming the hidden state information to the guidance vector information using the second head neural network.

7. The method of claim 1, further comprising producing the one or more target output tokens in a single forward pass of the target language model.

8. The method of claim 1, wherein the draft tokens in the set of draft tokens are produced auto-regressively by the draft language model.

9. The method of claim 1, further comprising transforming, using the draft language model, the combination of the prompt tokens, the one or more target output tokens, and the guidance vector information to the updated draft tokens, wherein the target language model has been trained based on a first loss measure that depends on a difference between first ground-truth information and the one or more target output tokens, and a second loss measure that depends on a difference between second ground-truth information and the updated draft tokens.

10. The method of claim 9, wherein the draft language model has also been trained based on the second loss measure.

11. The method of claim 9, wherein the first ground-truth information is text that is manually specified by a human reviewer as being correct, and wherein the second ground-truth information is text auto-regressively generated by the target language model.

12. The method of claim 1, further comprising switching to a mode in which the target language model is asked by the draft language model to generate an instance of guidance vector information for initial prompt tokens, and wherein generation of output tokens thereafter takes place based on the guidance vector information using the draft language model independent of interaction with the target language model.

13. A computing system for using a draft language model to accelerate generation of output tokens using a target language model, comprising:

an instruction data store for storing computer-readable instructions; and a processing system for executing the computer-readable instructions in the data store, to perform operations including:

receiving a set of target output tokens produced by the target language model, and guidance vector information produced by the target language model, wherein a combination of the prompt tokens, the set of target output tokens, and the guidance vector information comprise input tokens;

transforming the input tokens into draft tokens, wherein the target language model and the draft language model are two different neural networks, and wherein the draft language model has fewer parameters and is less accurate compared to the target language model, and wherein the draft language model consumes less memory and processing resources compared to the target language model, and wherein the draft language model is faster in operation compared to the target language model; and sending the draft tokens to the target language model, for use by the target language model in producing an updated set of target output tokens using a first head neural network and updated guidance vector information using a second head neural network that is different than the first head neural network.

14. The computing system of claim 13, wherein the updated set of target output tokens are produced by the target language model by selecting from among the draft tokens.

15. The computing system of claim 13, wherein the operations further comprise switching to a mode in which the target language model is asked by the draft language model to generate an instance of guidance vector information for initial prompt tokens, and wherein generation of output tokens thereafter takes place based on the guidance vector information using the draft language model independent of interaction with the target language model.

16. A computer-readable storage medium for storing computer-readable instructions, a processing system executing the computer-readable instructions to perform operations, the operations comprising each of:

receiving, by a target language model, a set of draft tokens produced by a draft language model based on, at least in part, prompt tokens provided to the draft language model;

wherein the target language model and the draft language model are two different neural networks, and wherein the target language model has more parameters and is more accurate compared to the draft language model, and wherein the target language model consumes more memory and processing resources compared to the draft language model, and wherein the target language model is slower in operation compared to the draft language model;

producing, using a first head neural network of the target language model, one or more target output tokens based on the prompt tokens and the set of draft tokens, the one or more target output tokens including zero, one, or more draft tokens chosen from among the set of draft tokens, and an additional target output token which is predicted by the target language model to follow the zero, one, or more draft tokens that are selected;

generating, using a second head neural network of the target language model, guidance vector information based on the prompt tokens and the set of draft tokens, wherein the second head neural network is different than the first head neural network, and wherein a combination of the prompt tokens, the set of target output tokens, and the guidance vector information comprise input tokens; and transforming, using the draft language model, the input tokens to updated draft tokens, the target language model has been trained based on a first loss measure that depends on a difference between first ground-truth information and the one or more target output tokens, and a second loss measure that depends on a difference between second ground-truth information and the updated draft tokens.

17. The computer-readable storage medium of claim 16, wherein the draft language model has also been trained based on the second loss measure.

18. The computer-readable storage medium of claim 16, wherein the first ground-truth information is text that is manually specified by a human reviewer as being correct, and wherein the second ground-truth information is text auto-regressively generated by the target language model.

19. The method of claim 12, wherein the mode is selected automatically based on one or more factors, as expressed in one or more input signals.

20. The computer-readable storage medium of claim 16, wherein the target language model operates by:

transforming the prompt tokens and the set of draft tokens to hidden state information using a base target language model;

transforming the hidden state information to output token probability information using the first head neural network, on basis of which the one or more target output tokens are produced; and transforming the hidden state information to the guidance vector information using the second head neural network.

* * * * *